United States Patent
Corbett et al.

(10) Patent No.: US 8,755,270 B2
(45) Date of Patent: Jun. 17, 2014

(54) CONGESTION/LOAD INDICATION FOR HIGH SPEED PACKET ACCESS

(75) Inventors: Eddie Corbett, Vallentuna (SE); Tjeerd De Boer, Marsta (SE); Erik Geijer Lundin, Stockholm (SE); Patrik Karlsson, Älta (SE); Seungtai Kim, Solna (SE); Waikwok Kwong, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 47 days.

(21) Appl. No.: 12/019,816

(22) Filed: Jan. 25, 2008

(65) Prior Publication Data

US 2008/0186862 A1    Aug. 7, 2008

Related U.S. Application Data

(60) Provisional application No. 60/888,259, filed on Feb. 5, 2007.

(51) Int. Cl.
| | |
|---|---|
| *H04J 1/16* | (2006.01) |
| *H04W 72/04* | (2009.01) |
| *H04W 92/12* | (2009.01) |
| *H04W 28/18* | (2009.01) |

(52) U.S. Cl.
CPC .......... *H04W 72/0486* (2013.01); *H04W 92/12* (2013.01); *H04W 72/0433* (2013.01); *H04W 28/18* (2013.01)
USPC .......................... 370/230; 370/329; 370/395.2

(58) Field of Classification Search
CPC ........ H04L 47/10; H04L 47/11; H04W 28/04
USPC .............. 370/229–236.1, 310, 328, 329, 351, 370/389, 395.1, 395.2
See application file for complete search history.

(56) References Cited

U.S. PATENT DOCUMENTS 6,160,875 A * 12/2000 Park et al. ...................... 379/133
6,760,303 B1 * 7/2004 Brouwer ........................ 370/229

(Continued)

FOREIGN PATENT DOCUMENTS

| CN | 1653718 A | 8/2005 |
|---|---|---|
| EP | 1 672 845 A1 | 6/2006 |

(Continued)

OTHER PUBLICATIONS

Agere Systems, "HSDPA Mobile Broadband Data; A Smarter Approach to UMTS Downlink Data", Feb. 2005.

(Continued)

*Primary Examiner* — Obaidul Huq
(74) *Attorney, Agent, or Firm* — Nixon & Vanderhye, P.C.

(57) ABSTRACT

A radio access network (20) comprises a radio network controller (26) and a radio base station (28). The radio network controller (26) is configured to perform admission control and to allocate resources of a cell. The radio base station (28) is configured to determine load/congestion on a high speed shared channel and to generate an indication of the load/congestion for transmission to the radio network controller. In some example embodiments and modes, at least one of the radio network controller and the radio base station is configured to allocate at least some of the resources for the high speed shared channel to support a guaranteed service and also to allocate at least some resources to support a non-guaranteed service. In some example implementations of this aspect, a user(s) of the non-guaranteed service is permitted to use the resources up to a reserved resource level of resources. According to another non-limiting aspect of the technology, the radio base station is further configured to generate a recommended action for dealing with the load/congestion.

37 Claims, 14 Drawing Sheets

(56) References Cited

U.S. PATENT DOCUMENTS

| | | | |
|---|---|---|---|
| 7,564,788 B2 | 7/2009 | Lundh et al. | |
| 7,710,922 B2 | 5/2010 | Lundh et al. | |
| 7,724,656 B2 | 5/2010 | Sagfors et al. | |
| 2002/0077113 A1* | 6/2002 | Spaling et al. | 455/453 |
| 2003/0210660 A1* | 11/2003 | Wiberg et al. | 370/320 |
| 2004/0252669 A1* | 12/2004 | Hosein | 370/342 |
| 2005/0249120 A1 | 11/2005 | Heo et al. | |
| 2005/0249148 A1 | 11/2005 | Nakamata et al. | |
| 2005/0255873 A1* | 11/2005 | Zhang et al. | 455/522 |
| 2006/0087974 A1* | 4/2006 | Ozer et al. | 370/235 |
| 2006/0142040 A1* | 6/2006 | Jones | 455/522 |
| 2006/0146749 A1 | 7/2006 | Lundh et al. | |
| 2006/0159016 A1 | 7/2006 | Sågfors et al. | |
| 2006/0182064 A1 | 8/2006 | Durand et al. | |
| 2006/0182065 A1* | 8/2006 | Petrovic et al. | 370/332 |
| 2007/0070938 A1* | 3/2007 | Hori et al. | 370/328 |
| 2007/0127522 A1 | 6/2007 | Lundh et al. | |
| 2007/0178927 A1* | 8/2007 | Fernandez-Corbaton et al. | 455/522 |
| 2007/0225015 A1* | 9/2007 | Mueckenheim et al. | 455/453 |
| 2008/0002617 A1 | 1/2008 | Peisa et al. | |
| 2008/0002646 A1 | 1/2008 | Hannu et al. | |
| 2008/0043623 A1* | 2/2008 | Franceschini et al. | 370/235 |
| 2008/0080424 A1 | 4/2008 | Torsner et al. | |
| 2008/0130495 A1* | 6/2008 | Dos Remedios et al. | 370/230 |
| 2008/0130508 A1* | 6/2008 | Vikstedt et al. | 370/241 |
| 2008/0132281 A1* | 6/2008 | Kim et al. | 455/562.1 |
| 2009/0215462 A1 | 8/2009 | Lundh et al. | |
| 2009/0221292 A1 | 9/2009 | Lundh et al. | |

FOREIGN PATENT DOCUMENTS

| | | |
|---|---|---|
| JP | 2006-515736 | 6/2006 |
| JP | 2006-515736 A | 6/2006 |
| WO | 03/096571 A1 | 11/2003 |
| WO | WO 2004/064426 A1 | 7/2004 |
| WO | 2007/024167 A1 | 3/2007 |
| WO | 2007/024168 A1 | 3/2007 |
| WO | 2008/097168 A2 | 8/2008 |

OTHER PUBLICATIONS

3GPP TS 25.321 V7.1.0 (Jun. 23, 2006), 3rd Generation Partnership Project; Technical Specification Group Radio Access Network; Medium Access Control (MAC) protocol specification (Release 7).
3GPP TS 25.425 V7.1.0 (Jun. 16, 2006)3rd Generation Partnership Project; Technical Specification Group Radio Access Network; UTRAN Iur interface user plane protocols for Common Transport Channel data streams (Release 7).
International Search Report mailed Sep. 4, 2008 in corresponding PCT application PCT/SE2008/050125.
3GPP TSG-RAN2 Meeting #35 R2-030666, "Information to be Signaled for HSDPA Call Admission Control and Congestion Control", Seoul, South Korea, Apr. 7-11, 2008, Siemens.
3GPP TR 25.922 V7.0.0 Technical Report $3^{rd}$ Generation Partnership Project; Tech. Spec. Group Radio Access Network; Radio Resource Management Strategies (Release 7) (Dec. 2006).
3GPP TSG-RAN2 Meeting #53, R3-061197, "Congestion Status Indication in E-UTRA", Tallinn, Estonia, Aug. 28-Sep. 1, 2006.
3GPP TSG-RAN2 Meeting #27 R3-020530, "RL Congestion Email Discussion Report", Orlando, FL, Rapporteur (Vodafone Ltd.), Feb. 18-22, 2002.
3GPP TSG-RAN2 Meeting #34 R3-030322, "Guaranteed Power for HSDPA", Sophia Antipolis, France, Nortel Networks, Feb. 17-21, 2003.
3GPP TSG-RAN2 Meeting #36 R3-030675, "Power Usage Reporting for HSDPA", Paris, France; Lucent Technologies, May 19-23, 2003.
3GPP TSG-RAN2 Meeting #33 R3-0224444, "Admission Control in HSDPA", Sophia Antipolis, France; Lucent Technologies, Nov. 12-15, 2002.
3GPP TSG-RAN2 Meeting #55 R3-070429, "HSDPA and EUL Congestion Indication", St. Louis, Missouri, Agenda Item: 12.6.6 Source: Ericsson, Feb. 12-16, 2007.
3GPP TS 25 435 V7.1.0 (Mar. 16, 2006), $3^{rd}$ Generation Partnership Project; Technical Specification Group Radio Access Network; UTRAN Iub Interface User Plane Protocols for Common Transport Channel Data Streams (Release 7).
3GPP TS 25.331 V7.1.0 (Jun. 23, 2006), $3^{rd}$ Generation Partnership Project; Technical Specification Group Radio Access Network; Radio Resource Control (RRC); Protocol Specification (Release 7).
3GPP TS 25.433 V7.1.0 (Jun. 20, 2006); $3^{rd}$ Generation Partnership Project; Technical Specification Group Radio Access Network; UTRAN Iub interface Node B Application Part (NBAP) signaling (Release 7).
Japanese Final Office Action mailed Dec. 4, 2012 in Japanese Patent Application 2009-548202.
Nortel Networks, "Guaranteed Power of HSDPA", 3GPP TSG-RAN# Meeting #34, R3-030322, Feb. 21, 2003.
Ericsson, "Congestion Status Indication in E-UATRA", 3GPP TST-RAN WG3 Meeting #53, R3-061197, Aug. 23, 2006.
Rapporteur (Vodafone Ltd), "RL Congestion Email Discussion Report", 3GPP RAN WG3 Meeting #27, Orlando, Florida, USA, R3-020530, Feb. 15, 2002.
3GPP TSG-RAN2 Meeting #35; "Information to be Signaled for HSDPA Call Admission Control and Congestion Control," R2-030666; Seoul, South Korea, Apr. 7-11, 2003.
Japanese Office Action issued in Application No. 2009-548202 dated Aug. 21, 2012 with summary of Office Action in English.
Chinese Office Action and English translation thereof mailed Feb. 23, 2012 in Chinese application 200880011505.0.
3GPP TSG-RAN2 Meeting #35 R2-030666, Siemens: Information to be Signaled for HSDPA Call Admission Control and Congestion Control, Apr. 11, 2003.
3GPP RAN WG3#27 R3-020530, Rapporteur (Vodafone Ltd), "RL Congestion Email Discussion Report", Feb. 22, 2002.
3GPP TSG-RAN 3 Meeting #34 R3-030322, Nortel Networks: "Guaranteed Power for HSDPA", Feb. 21, 2003.
Chinese Office Action and English translation thereof mailed Dec. 26, 2013 in Chinese Patent Application 200880011505.0.
Supplementary EP Search Report mailed Feb. 3, 2014 in EP application 08712765.0.
Lucent Technologies, "Admission Control in SHDPA", 3GPP TSG-RAN WG3#33, R3-022444, Sophia Antipolis, France, Nov. 12-15, 2002.
Ericsson, "HSDPA and EUL Congestion Indication", 3GPP TSG-RAN WG3 #55, Re-070127, US, St. Louis, MO, Feb. 12-16, 2007.

* cited by examiner

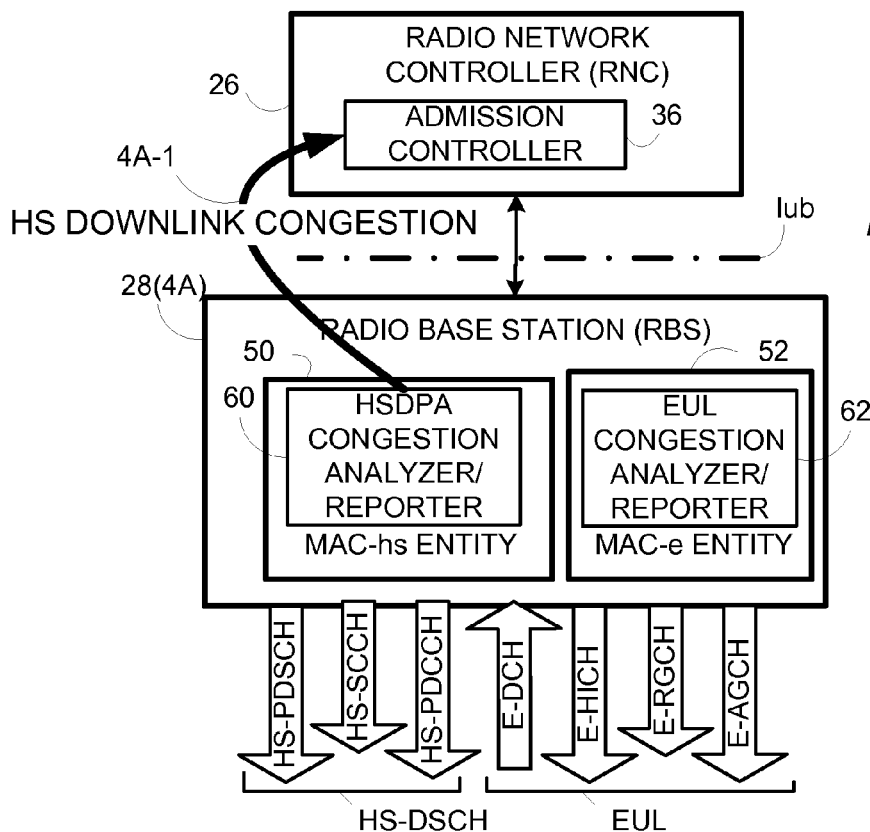
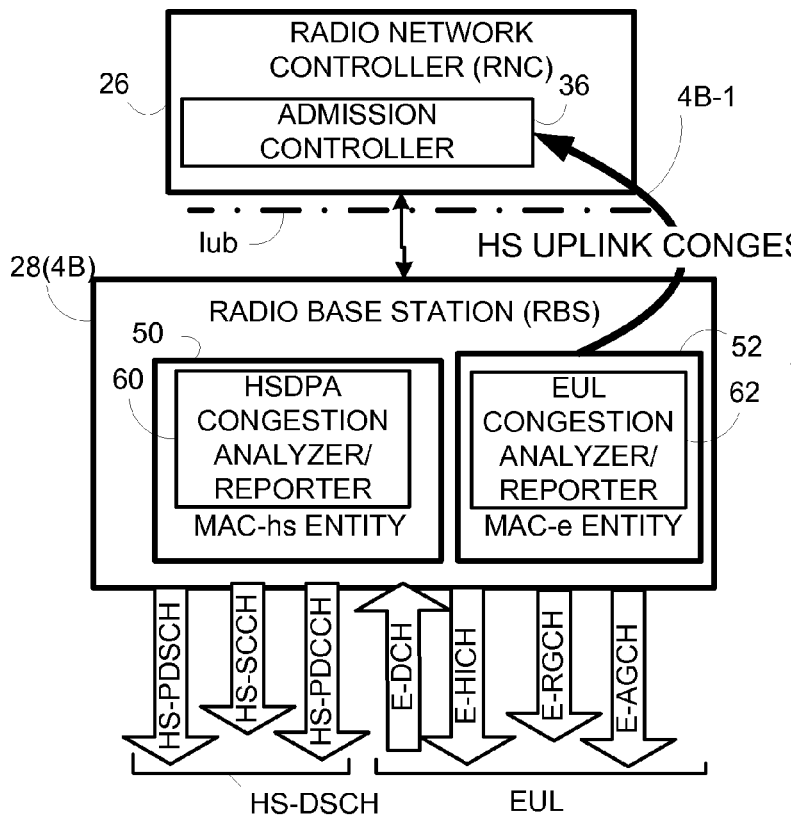

CONGESTION/LOAD INDICATION FOR HIGH SPEED PACKET ACCESS

This application claims the benefit and priority of U.S. provisional patent application 60/888,259, filed Feb. 5, 2007, entitled "CONGESTION/LOAD INDICATION FOR HIGH SPEED PACKET ACCESS", which is incorporated by reference herein in its entirety.

BACKGROUND

I. Technical Field

The present invention pertains to telecommunications, and particularly to determining load and/or congestion on high speed packet access channels.

II. Related Art and Other Considerations

In a typical cellular radio system, mobile terminals (also known as mobile stations and mobile user equipment units (UEs)) communicate via a radio access network (RAN) to one another and/or one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station or (in UTRAN parlance) "NodeB" (the terms such as radio base station and NodeB being used interchangeably herein). A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. The radio access network of the UMTS is often referred to as the "UTRAN".

As technologies advance, various services require higher data rates and higher capacity. Although UMTS has been designed to support multi-media wireless services, in some instances it turns out that the maximum data rate is not enough to satisfy the required quality of services.

In a forum known as the Third Generation Partnership Project (3GPP), telecommunications suppliers propose and agree upon standards for third generation networks and UTRAN specifically, and investigate enhanced data rate and radio capacity. One result of the forum's work is the High Speed Downlink Packet Access (HSDPA) for the downlink, which was introduced in 3GPP WCDMA specification Release 5.

Concerning High Speed Downlink Packet Access (HS-DPA) generally, see, e.g., 3GPP TS 25.435 V7.1.0 (Jun. 16, 2006), 3rd Generation Partnership Project; Technical Specification Group Radio Access Network; UTRAN $I_{ub}$ Interface User Plane Protocols for Common Transport Channel Data Streams (Release 7), which discusses High Speed Downlink Packet Access (HSDPA) and which is incorporated herein by reference in its entirety. Also incorporated by reference herein as being produced by the forum and having some bearing on High Speed Downlink Packet Access (HSDPA) or concepts described herein include: 3GPP TS 25.321 V7.1.0 (Jun. 23, 2006), 3rd Generation Partnership Project; Technical Specification Group Radio Access Network; Medium Access Control (MAC) protocol specification (Release 7); 3GPP TS 25.331 V7.1.0 (Jun. 23, 2006), 3rd Generation Partnership Project; Technical Specification Group Radio Access Network; Radio Resource Control (RRC); Protocol Specification (Release 7); 3GPP TS 25.425 V7.1.0 (Jun. 16, 2006), 3rd Generation Partnership Project; Technical Specification Group Radio Access Network; UTRAN Iur interface user plane protocols for Common Transport Channel data streams (Release 7); and 3GPP TS 25.433 V7.1.0 (Jun. 20, 2006), 3rd Generation Partnership Project; Technical Specification Group Radio Access Network; UTRAN Iub interface Node B Application Part (NBAP) signaling (Release 7).

High Speed Downlink Packet Access (HSDPA) achieves higher data speeds by, e.g., shifting some of the radio resource coordination and management responsibilities to the base station (RBS) from the radio network controller (RNC). Those responsibilities include one or more of the following: shared channel transmission, higher order modulation, link adaptation, radio channel dependent scheduling, and hybrid-ARQ with soft combining. In terms of fast link adaptation, the link adaptation is done by selecting the best modulation and coding scheme based on channel quality indicator from the mobile terminal (e.g., the user equipment unit (UE)). For fast scheduling, the selection of the user is done in the Node B, which has access to the link quality information, and thus can select the optimal user. Hybrid ARQ from Node B involves having a retransmission mechanism in the base station which allows fast retransmissions and quick recovery of erroneous link adaptation decisions. As a short TTI, a two millisecond (ms) TTI is used for transmissions.

In accordance with the first of the shifted responsibilities, i.e., shared channel transmission, HSDPA multiplexes user information for transmission on the high-speed downlink shared channel (HS-DSCH) in time-multiplexed intervals (called transmission time intervals (TTI)) over the air interface to the mobile terminal. Three new physical channels are introduced with HSDPA to enable HS-DSCH transmission. The high-speed shared control channel (HS-SCCH) is a downlink control channel that informs mobile devices when HSDPA data is scheduled for them, and how they can receive and decode it. The high-speed dedicated physical control channel (HS-DPCCH) is an uplink control channel used by the mobile to report the downlink channel quality and request retransmissions. The high-speed physical downlink shared channel (HS-PDSCH) is a downlink physical channel that carries the HS-DSCH user data. Several HS-PDSCHs are assigned to a mobile for each transmission. Each HS-PDSCH has a different OVSF channelization code.

HSDPA features a high speed channel (HSC) controller at the radio base station that functions, e.g., as a high speed scheduler, by multiplexing the user information for over the entire HS-DSCH bandwidth in the transmission time intervals (TTI). The HSDPA controller is commonly referred to also as HSDPA scheduler. Since HSDPA uses code multiplexing, several users can be scheduled at the same time.

The High Speed Downlink Packet Access (HSDPA) was followed by introduction of High Speed Uplink Packet Access (HSUPA) with its Enhanced Dedicated Channel (E-DCH) in the uplink in 3GPP WCDMA specification Release 6. E-DCH is a dedicated uplink channel (from a user equipment unit (UE) to a Node-B) that has been enhanced. Enhancements include using a short transmission time interval (TTI); fast hybrid ARQ (HARQ) between mobile terminal and the Node-B (with soft combining); scheduling of the transmission rates of mobile terminals from the Node-B. In addition, E-DCH retains a majority of the features characteristic for dedicated channels in the uplink.

Thus, currently WCDMA provides high speed packet access (HSPA) through the common channel HSDPA and the Enhanced Uplink (HSUPA). In their initial phases, typical implementations of HSDPA and Enhanced UL only supported interactive/background traffic, e.g., HSDPA and EUL only allocated any resources remaining after regular (e.g., pre-HSPA) dedicated channels (DCH) had consumed the resources that the dedicated channels required. Downlink control channels for EUL are included in the HSDPA power group, i.e., not in the non-HSDPA group for which DCH belongs.

Generally for WCDMA the radio network controller performs connection admission and resource allocation and scheduling functions for an admitted connection. But with the advent of HSDPA and later with EUL, it was more expedient to let the Node-B undertake (for HSDPA and EUL) some functionalities which previously were performed by the radio network controller. Thus, the Node-B was provided with a scheduler for the HSDPA and a scheduler for EUL to perform resource allocation and scheduling for connections which respectively share in the HSPDA and EUL. Thus, at least where HSDPA and EUL are involved, there is essentially a two tier allocation and scheduling: an upper tier performed by the radio network controller for connections generally, and a lower tier performed by the Node-B for connections using the HSDPA and EUL. The lower tier allocation and scheduling as performed by the Node-B occurs in a time frame of milliseconds, whereas the upper tier allocation and scheduling as performed by the radio network controller occurs with a longer time perspective (e.g., seconds).

The allocation and scheduling of the lower tier as preformed by the Node-B initially did not significantly impact the upper tier allocation and scheduling as performed by the radio network controller. This non-impact resulted, at least in part, from the aforementioned fact that the NodeB schedulers locally adapted the traffic to use the remaining power (or noise rise) resources left over from the guaranteed bit rate (GBR) traffic (e.g., conversational and streaming traffic), the guaranteed bit rate (GBR) traffic having already been admitted by the admission control function of the radio network controller. That is, for HSDPA and EUL the non-GBR traffic uses the remaining power left over from the GBR traffic.

HSDPA and EUL are continuing to evolve. For example, 3GPP Technical Specifications have introduced some basic possibility to report up and down link power consumption of the DCH and the HSDPA with its respective Enhanced Up link. See, e.g., 3GPP TS 25.433 V7.3.0 2006-12), 3rd Generation Partnership Project; Technical Specification Group Radio Access Network; UTRAN Iub interface Node B Application Part (NBAP) signaling, (Release 7), Section 8.2.9 and Section 9.1.21, which are incorporated herein by reference. Using such reports, a radio network controller (RNC) can distinguish between a situation wherein DCH has encountered a power overload situation and a situation wherein high power consumption is due to heavy HSDPA or Enhanced up link traffic. The 3GPP Technical Specifications have also introduced some basic possibility for reporting (to the radio network controller (RNC) from the radio base station) required power per priority class.

In the traditional way the 3GPP has looked at the role of the NodeB, the CRNC has been seen as the controlling node for the NodeB resources. This control is retrieved by providing CRNC with measurements on, or models of, the NodeB resources. Even before the introduction of high speed (HS) shared channels, this was already a problem, e.g., for controlling the NodeB hardware (HW) resources. The simple linear standardized model introduced by 3GPP (credit and consumption laws) cannot provide an accurate model of the available HW (both architecture dependent and NodeB algorithm dependent). Upon introduction of shared channels, it was the intention that the nodeB would allow those channels to use only the remaining resources, and therefore without strict resource control from CRNC (which would be too slow anyway). As HS becomes more and more an alternative for dedicated channels, the need for controlling the nodeB resources for both dedicated and shared channels in a central location (CRNC) becomes clearer.

A "NodeB resource model" was provided to the radio network controller in conjunction with a feature known as "Audit Response". The Audit Response provides information about the status of the NodeB to the RNC. The Audit Response includes a static NodeB resource model to the CRNC and is only intended to be reported when NodeB informs the CRNC about a change (e.g. license or hardware failure), which results in the CRNC requesting an audit from the NodeB. The Audit Response procedure is too slow and inaccurate to provide a proper congestion detection method. Moreover, as several generations of enhanced NodeB circuit boards are being produced and the technical evolution giving different resource consumption models, the present NodeB aggregate resource model becomes increasingly inaccurate.

The current approach of CRNC modeling the nodeB resources and making decisions is not a future-proof way. As mentioned, it will be too slow, inaccurate and not allow vendors to make optimal resource control decisions.

The standard has, until now, only provided some solutions for measuring the NodeB shared channel behavior. There is a required power measurement, allowing the CRNC to balance the DL power resource between dedicated (R99) and shared channels and a provided bitrate measurement. There is no provisioning for a similar power measurement on UL shared channels (i.e. the required headroom to guarantee the GBR scheduled services on E-DCH), nor is there a proper way of monitoring the situation of the non-GBR services mapped on shared channels in UL or DL. Also, as power is not the only limiting resource, there is information missing about the type of resources nodeB requires to satisfy the users (e.g. codes, HW).

A basic problem now exists in view, e.g., of the discrepancies in time perspective between the radio network controller (RNC) and the radio base station (RBS) as these nodes perform their above-summarized responsibilities. A basic problem is that the existing RBS-to-RNC reporting is not sufficient (e.g., not fast enough and/or accurate enough) to enable good resource handling and prioritization by the radio network controller. The basic problem is illustrated by the four following example perplexing scenarios.

First Scenario: If resources are to be reserved for the interactive/background traffic on HSDPA, the existing solution is not able to report when that reservation can not be fulfilled by the radio base station. This inability occurs because the current standard does not provide complete information in the current set of measurements. Summing up the 'required power per priority class' and the 'total non-HS power' and subtracting that from the 'total carrier power' (Pwr_used) respective 'maximum cell power capability' (Pwr_avail) will result in a Pwr_non_interactive estimate. This value will not give the required information, e.g., will not advise about the unhappiness of the non-guaranteed users mapped on HSDPA. First of all Pwr_non_interactive also includes the DL EUL power. Secondly, if Pwr_used is equal to Pwr_avail and Pwr_non_interactive is less than the reserved power level, then the radio network controller (RNC) can not know if the interactive/background traffic could utilize more resources, i.e. cannot know if the interactive/background traffic has so much more data in the buffers that it would really benefit from removing DCH or guaranteed traffic. That knowledge is only available in the RBS.

Second Scenario: The HSDPA channel generally utilizes two types of resource: channelization codes and power. When channelization code may be a limitation it is possible to increase the amount of power per code to increase the rates. Or if the power is limited, increasing the number of channelization codes employed may increase the rate. However, increasing the number of channelization codes is not always possible, because (more) channelization codes may not be available. Moreover, even if it were possible to increase the number of HS-PDSCH codes, in some situations such increase would not be beneficial if there is a limitation or lack of availability of HS-SCCH codes. With the existing solution it is not possible for the RNC to distinguish these situations, it can only receive reports of the used power or the required power per priority class. The RNC does not know when it should need to increase the number of codes to be able to solve the HSDPA overload situation. In other words, the RNC does not know what causes any unhappiness.

Third Scenario: The existing solution does not contemplate that resources could be reserved for the interactive/background traffic on EUL, and therefore the existing solution provides no mechanism for reporting when that reservation can not be fulfilled by the RBS. The current standard does not provided an indication of the required uplink power needed for scheduled GBR users on the E-DCH. Extracting the difference between total_received_power and the total_non-EUL_received power will not give required information. If the total_received_power is equal to the total_nonEUL_received_power it is not possible to know if there is any interactive E-DCH scheduled traffic that could have utilized more resources, i.e., if the interactive/background traffic has more data in the buffers so it would benefit from removing DCH or guaranteed traffic. That knowledge is only available in the radio base station.

Fourth Scenario: In accordance with the existing solution the radio network controller (RNC) does not have appropriate information from the radio base station for the radio network controller (RNC) to know which service/user is suffering, e.g., which service/user cannot have its quality of service (QoS) requirements fulfilled. Therefore the radio network controller (RNC) will never be able to take an intelligent decision of balancing the load between the DCH and the E-DCH traffic. For example, it may be to no avail to remove from the system a user on DCH with low priority who is suffering unfulfilled quality of service (QoS). But if it is a high priority E-DCH user who is having QoS problem, and there also exists a lower priority DCH user, then the RNC should remove the DCH user instead.

What is need therefore, and an object of the present invention, are one or more of apparatus, methods, techniques, and/or systems for improving the resource estimation and reporting from the radio base station to the radio network controller (RNC) to enable accurate and efficient resource control for a high speed packet access channel(s).

BRIEF SUMMARY

A radio access network comprises a radio network controller and a radio base station. The radio network controller is configured to perform admission control and to allocate resources of a cell. The radio base station is configured to determine load/congestion on a high speed packet access channel and to generate an indication of the load/congestion for transmission to the radio network controller.

According to a non-limiting aspect of the technology, the radio base station is configured to determine and to report the load/congestion (e.g., overload congestion) of a high speed downlink packet access shared channel, of a high speed uplink packet access channel, or both a high speed downlink packet access shared channel and a high speed uplink packet access channel. Moreover, according to another example aspect, the load/congestion can be reported for a cell served by the radio base station, or for a local cell group served by the radio base station.

In some example embodiments and modes, at least one of the radio network controller and the radio base station is configured to allocate at least some of the resources for the channel to support a guaranteed service and also to allocate at least some resources to support a non-guaranteed service.

In differing or combined implementations, the radio base station can be configured to determine and to report load/congestion on the channel for the guaranteed service and/or for the non-guaranteed service. Since either or both of the guaranteed service and the non-guaranteed service can have plural priority levels, reporting of load/congestion, for the guaranteed service and/or the non-guaranteed service, can optionally be on a priority level basis or priority class basis. An example of priority level/class is allocation/retention priority, which can apply to shared channels and non-shared channels.

In accordance with one aspect of the technology, in example embodiments and modes wherein the channel is a HS-DPA channel, the radio base station can be configured to determine and to report the load/congestion by measuring used downlink power for the channel. The measuring of the used downlink power can be either for a guaranteed service, a non-guaranteed service, or both. Further, for the guaranteed service and/or the non-guaranteed service, measuring of the used downlink power can optionally be on a scheduling priority class basis.

In accordance with another aspect of the technology and other example embodiments and modes wherein the channel is a downlink channel, the radio base station is configured to measure and to report downlink power utilized on the downlink channel by uplink control channels of a high speed packet access uplink channel. For example, the high speed packet access uplink channel can be an E-DCH channel and the control channels used in the downlink for E-DCH can be E-HICH, E-RGCH, and E-AGCH channels. Further, in implementations wherein at least some of the resources for the channel are allocated to support a guaranteed service and at least some resources are allocated to support a non-guaranteed service, the radio base station can be configured to measure and to report the downlink power utilized on the downlink channel by the uplink control channels of the high speed uplink packet access channel for the guaranteed service, for the non-guaranteed service, or both. Further, for the guaranteed service and/or the non-guaranteed service, the measuring and reporting of the downlink power utilized on the downlink channel by the uplink control channels of the high speed packet access uplink channel can optionally be on a priority class basis.

In accordance with another non-limiting aspect of the technology, in example embodiments and modes wherein the channel is a high speed uplink packet access channel, the radio base station can be configured to determine and to report the load/congestion by measuring received uplink power for the channel. The measuring of the received uplink power can be either for a guaranteed service, a non-guaranteed service, or both. Further, for the guaranteed service and/or the non-guaranteed service, measuring of the received uplink power can optionally be on a priority class basis.

In accordance with another non-limiting aspect of the technology, at least one of the radio network controller and the radio base station is configured to set a reserved resource level for the non-guaranteed service. In some example implementations of this aspect, a user(s) of the non-guaranteed service is permitted to use the resources up to the reserved resource level of resources. But when there is a differential amount of reserved resources between the reserved resource level and an actual level of reserved resources utilized by the user(s) of the non-guaranteed service, the radio base station is configured to allow another user of the cell to use at least some of the differential amount of reserved resources. Such another user can be, for example, a user of the guaranteed service (DCH) or a user of a non-high speed service.

According to one non-limiting aspect of the technology, the radio base station is further configured to generate to generate a congestion report including a congestion severity indicator. In an example implementation, the severity indicator is expressed in terms of an allocation/retention priority level.

According to one non-limiting aspect of the technology, the radio base station is further configured to indicate a cause of the load/congestion. For example, the indicated cause of congestion can be at least one of (1) power and/or noise rise for a non-shared dedicated channel (e.g., DCH); (2) channelization code issues (e.g., lack of channelization codes) for the high speed packet access channel; and/or (3) a hardware issue arising, e.g., at the NodeB.

According to another non-limiting aspect of the technology, the radio base station is further configured to generate a recommended action for dealing with the load/congestion. The recommended action includes at least one of (1) reducing power and/or noise rise for a non-shared dedicated channel (e.g., DCH) and (2) adding a code for the high speed packet access channel (e.g., adding a code for a shared physical packet channel (HS-DPSCH) and/or a shared physical signaling channel (HS-SCCH)).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4A-FIG. 4D are diagrammatic views showing portions of a radio access network for depicting generation and transmission of a congestion message(s) for a high speed packet access channel as detected in a cell.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
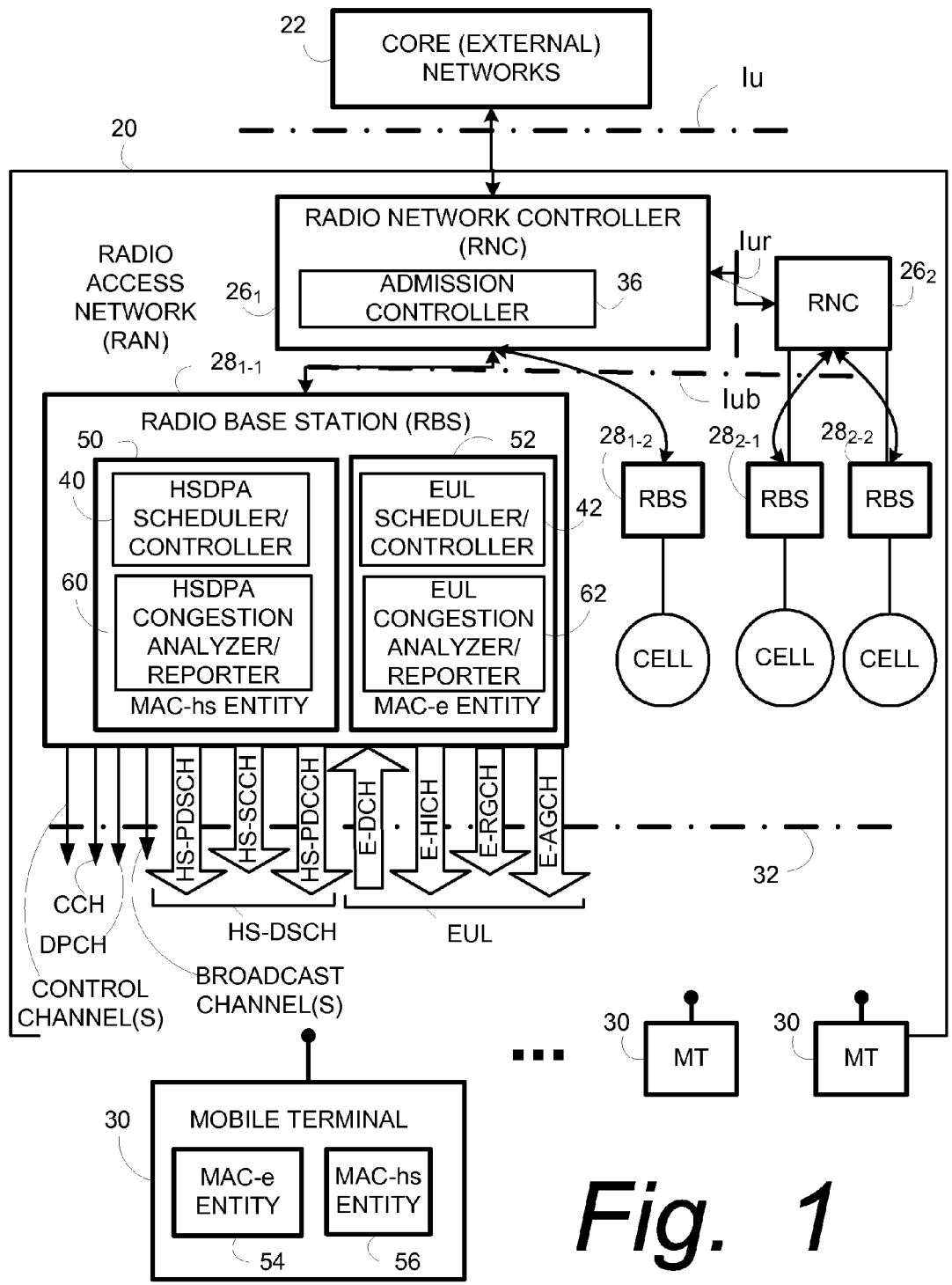
FIG. 1 is a diagrammatic view of representative portions of an example radio access network (RAN).

The technology described herein is advantageously illustrated in the example, non-limiting, context of a telecommunications system such as that schematically depicted in FIG. 1. The example telecommunications system of FIG. 1 shows a radio access network 20 connected to one or more external (e.g., core) networks 22. The external networks 22 may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., a Mobile Switching Center (MSC) node and a Serving General Packet Radio Service (GPRS) Support node (SGSN) working in conjunction with a Gateway GRPS Support Node (GGSN).

Each of the core network service nodes connects to the radio access network (RAN) 20 over a suitable interface. In the particular, non-limiting example shown in FIG. 1, the radio access network (RAN) 20 is a UMTS Terrestrial Radio Access Network (UTRAN) and the interface with the external network is over the Iu interface. The radio access network (RAN) 20 includes one or more radio network controllers (RNCs) 26 and one or more radio base stations (RBS) 28.

For sake of simplicity, the radio access network (RAN) 20 of FIG. 1 is shown with only two RNC nodes, particularly RNC $26_1$ and RNC $26_2$. Each RNC 26 is connected to one or more base stations (BS) 28 over an Iub interface. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 1 shows that an RNC can be connected over an Iur interface to one or more other RNCs in the UTRAN 24. Further, those skilled in the art will also appreciate that a base station is sometimes also referred to in the art as a radio base station, a node B, or B-node (all of which are used interchangeably herein).

In the illustrated embodiments, for sake of simplicity each base station 28 is shown as serving one cell. For base station $28_{1-2}$, for example, the cell is represented by a circle. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers. Cells of a NodeB can be associated in a local "cell group", which refers, e.g., to the fact that resources (typically hardware resources) can be shared by plural cells served by the NodeB, which means that in some situations congestion applies to a local group of NodeB cells.

As shown in FIG. 1, mobile terminals (MT) 30 communicate with one or more cells or one or more base stations (BS) 28 over a radio or air interface 32. In differing implementations, the mobile terminals (MT) 30 can be known by different names, such as wireless terminal, mobile station or MS, user equipment unit, handset, or remote unit, for example. Each mobile terminal (MT) may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc. Preferably, at least for a UTRAN implementation of the radio access network (RAN) 20, radio access is based upon Wideband, Code Division Multiple Access (WCDMA) with individual radio channels allocated using CDMA spreading codes. Of course, other access methods may be employed.

FIG. 1 further illustrates in simplified form that different types of channels may exist between one of the base stations 28 and mobile terminals (MT) 30 for transport of control and user data. For example, in the forward or downlink direction, there are several types of broadcast channels, one or more control channels, one or more common traffic channels (CCH), dedicated traffic channels (DPCH), and the high-speed downlink shared channel (HS-DSCH). Although not shown as such in FIG. 1, the downlink dedicated physical channel (DPCH) carries both the Dedicated Physical Data Channel (DPDCH) and the Dedicated Physical Control Channel (DPCCH). FIG. 1 shows the high-speed downlink shared channel (HS-DSCH) as including the high-speed physical downlink shared channel (HS-PDSCH), the high-speed shared control channel (HS-SCCH), and the high-speed dedicated physical control channel (HS-DPCCH). For the reverse or uplink direction, FIG. 1 shows the E-DCH channel and the uplink control channels E-HICH, E-RGCH, and E-AGCH which are used in the downlink for the E-DCH.

Thus, the radio access network 20 comprises at least one radio network controller 26 and at least one radio base station 28. The radio network controller 26 is configured to perform admission control and to allocate resources of a cell. To this end, the radio network controller (RNC) 26 is shown in FIG. 1 as having a connection admission controller 36 which performs admission control and resource allocation for connections in a cell. Further, the radio network controller (RNC) 26 configures the cell to support HSDPA and EUL. Thereafter it is up to the radio base station (RBS) 28 to allocate power and the amount of codes needed at respective TTI transmissions. Base stations provided with high-speed downlink packet access capability typically have a high-speed downlink packet access controller, e.g., a HSDPA scheduler or similar channel manager that governs allocation and utilization of the high-speed downlink shared channel (HS-DSCH) and a high-speed shared control channel (HS-SCCH) which is utilized for signaling purposes. The HSDPA controller is commonly referred to also as HSDPA scheduler. To this end, FIG. 1 shows radio base station (RBS) 28 as comprising HSDPA scheduler/controller 40. In addition, radio base station (RBS) 28 comprises EUL scheduler/controller 42.

The HSDPA scheduler/controller 40 is preferably included in a MAC-hs entity 50 of radio base station (RBS) 28, while EUL scheduler/controller 42 is preferably included in MAC-hs entity 52 of radio base station (RBS) 28. The MAC-hs entity 50 has a corresponding MAC-hs entity 54 in mobile terminal (MT) 30, and similarly MAC-hs entity 52 has a corresponding MAC-hs entity 56 in mobile terminal (MT) 30

In accordance with differing aspects of the technology described herein, the radio base station (RBS) 28 is configured to determine load/congestion on a high speed packet access channel and to generate an indication of the load/congestion for transmission to the radio network controller. Accordingly, by way of example implementation, FIG. 1 shows radio base station (RBS) 28 as comprising one or more congestion analyzers. For example, radio base station (RBS) 28 has both a HSDPA congestion analyzer/reporter 60 and an EUL congestion analyzer/reporter 62. In the example implementation shown in FIG. 1, HSDPA congestion analyzer/reporter 60 is included in MAC-hs entity 50 and EUL congestion analyzer/reporter 62 is included in MAC-hs entity 52.

It will be appreciated that, in one or more of the embodiments and implementations described herein and other embodiments and implementations encompassed hereby, that MAC-hs entity 50 and MAC-hs entity 52, may be realized by a controller or processor, as those terms are previously and expansively explained. Further, the HSDPA scheduler/controller 40 and HSDPA congestion analyzer/reporter 60 shown as comprising the MAC-hs entity 50 in the illustrated example of FIG. 1 may be separately provided as a controller(s) or processor(s) [as those terms are previously and expansively explained]. Similarly, the EUL scheduler/controller 42 and EUL congestion analyzer/reporter 62 shown as comprising MAC-hs entity 52 in the illustrated example of FIG. 1 may be separately provided as a controller(s) or processor(s) [as those terms are previously and expansively explained].

Figure 2:
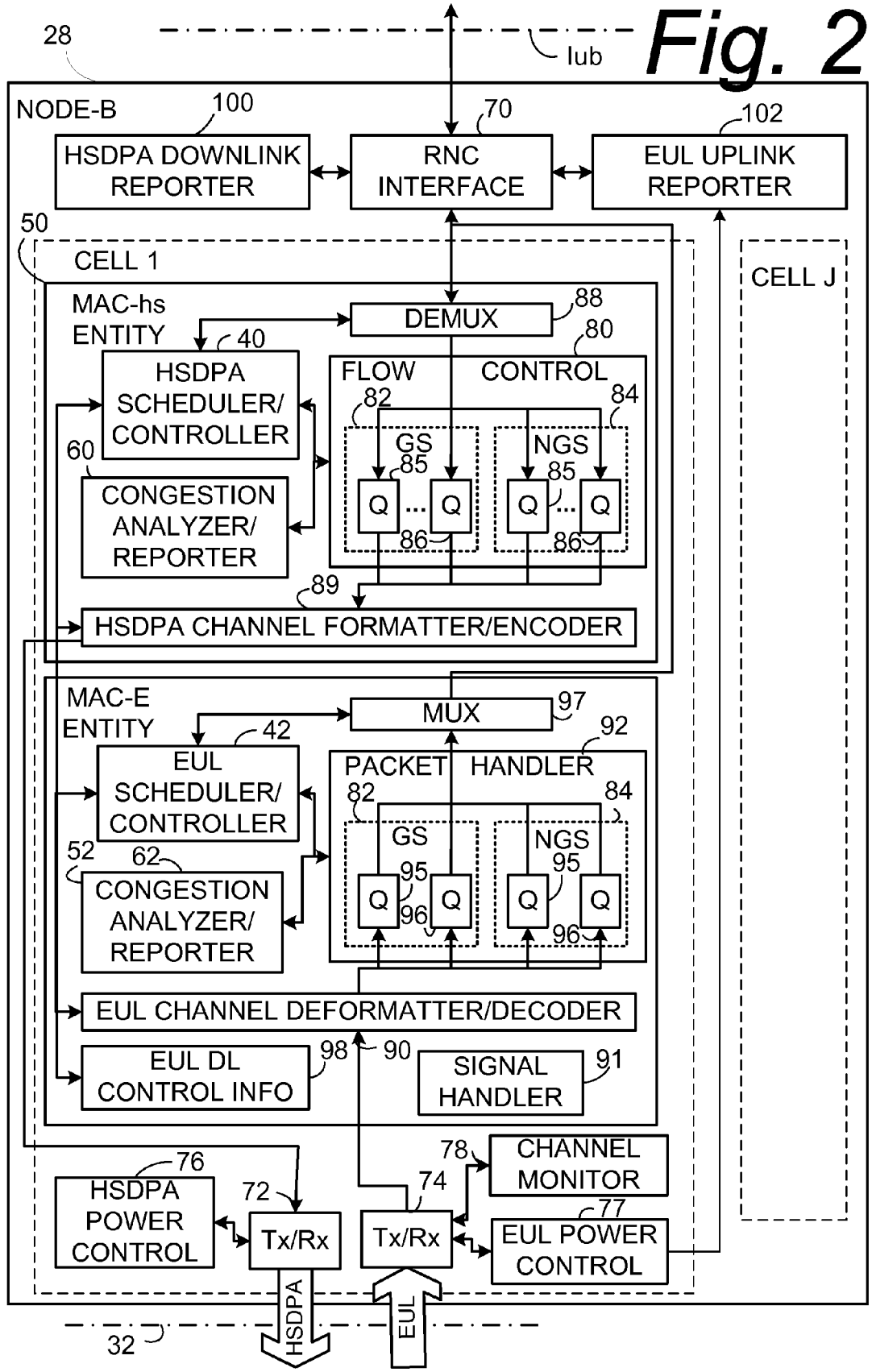
FIG. 2 is a diagrammatic view illustrating an example embodiment of a radio base station.

FIG. 2 shows, in more detail, an example, non-limiting implementation of a radio base station (RBS) 28. The greater detail of radio base station (RBS) 28 of FIG. 2 includes the fact that radio base station (RBS) 28 is shown as serving plural cells, e.g., cell 1 through cell J. In the particular example shown in FIG. 2, structures and resources serving each cell are separately shown as depicted by a corresponding broken line frame for the structure, functionalities, and resources for each cell. For sake of convenience and brevity, FIG. 2 only shows example structures and functionalities for cell 1. However, it will be appreciated that similar structures and functionalities are provided for other cells. Moreover, one or more structures and functionalities may be shared by plural cells, if desired.

The radio base station (RBS) 28 of FIG. 2 further includes an RNC interface 70 and transceivers, such as at least one transceiver 72 capable at least of transmitting HSDPA on the downlink across air interface 32 and such as at least one transceiver 74 capable at least of receiving EUL on the uplink across air interface 32. Associated with the HSDPA transceiver 72 is a HSDPA power controller 76; associated with EUL transceiver 74 is a EUL power controller 77 and a channel monitor 78.

Each cell served by radio base station (RBS) 28 of FIG. 2 has access to a MAC-hs entity such as MAC-hs entity 50 with its HSDPA scheduler/controller 40 and HSDPA congestion analyzer/reporter 60, as well as to a MAC-hs entity such as MAC-hs entity 52 with its EUL scheduler/controller 42 and EUL congestion analyzer/reporter 62, in the manner illustrated in FIG. 1.

In additional ways, for optional example implementations, FIG. 2 shows example, non-limiting implementations of MAC-hs entity 50 and MAC-hs entity 52 in more detail. The implementations reflected by FIG. 2 presume the optional capability that the one or the other, or both, of the HSDPA channel and the EUL channel can be configured to support one or more guaranteed service(s) and one or more non-guaranteed service(s). As used herein, a non-guaranteed user includes background traffic and interactive traffic. The distinction of guaranteed bit rate (GBR) and non-GBR services comes from the core network at the time of radio access bearer (RAB) establishment and is translated by the serving RNC (SRNC) into a GBR or non-GBR designation on the radio bearers and transport channels. The information is also available in the Control RNC (CRNC) and nodeB.

In optional embodiments the present technology enables one or more of HSPDA and EUL to support guaranteed services, typically those which are streaming and/or conversational, such as Speech/VoIP. Such services are, e.g., not content or satisfied with only using the remaining resources after allocation to dedicated channels. In addition, as explained further below, as a further option in such cases the present technology also facilitates reservation of a certain amount of the resources for interactive/background traffic on the HSDPA and its respective EUL.

Further, the implementations reflected by FIG. 2 presume the optional capability that one or more of the guaranteed service(s) and one or more of the non-guaranteed service(s) is structured to have hierarchical priority classes levels, such as (for example) quality of service (QoS) classes or allocation/retention priority classes. Using allocation/retention priority can be a basis for congestion reporting and is applicable to both shared channels and non-shared channels. As understood by those skilled in the art, although allocation/retention priority is not traditionally connected to QoS, QoS can be mapped to allocation/retention priority.

In view of the foregoing introduction of guaranteed services and priority levels, FIG. 2 shows by way of example that MAC-hs entity 50 further comprises a HSDPA flow controller 80 comprising packet queues Q, also known as priority queues. Queues Q framed by line 82 store packets of a representative guaranteed service (GS), while queues Q framed by line 84 store packets of a representative non-guaranteed service (NGS). Further, for each service, e.g., for each of representative guaranteed service (GS) 82 and representative non-guaranteed service (NGS) 84, plural queues Q are provided, with queue 85 representing (for each service) a highest priority queue and queue 86 representing (for each service) a lowest priority queue. The priority levels can be, for example, allocation/retention priority (ARP) levels. For each service there may be as many as fifteen priority levels, where priority level one is the highest and priority level fourteen is the lowest (priority level fifteen signifying "no priority").

Figure 3:
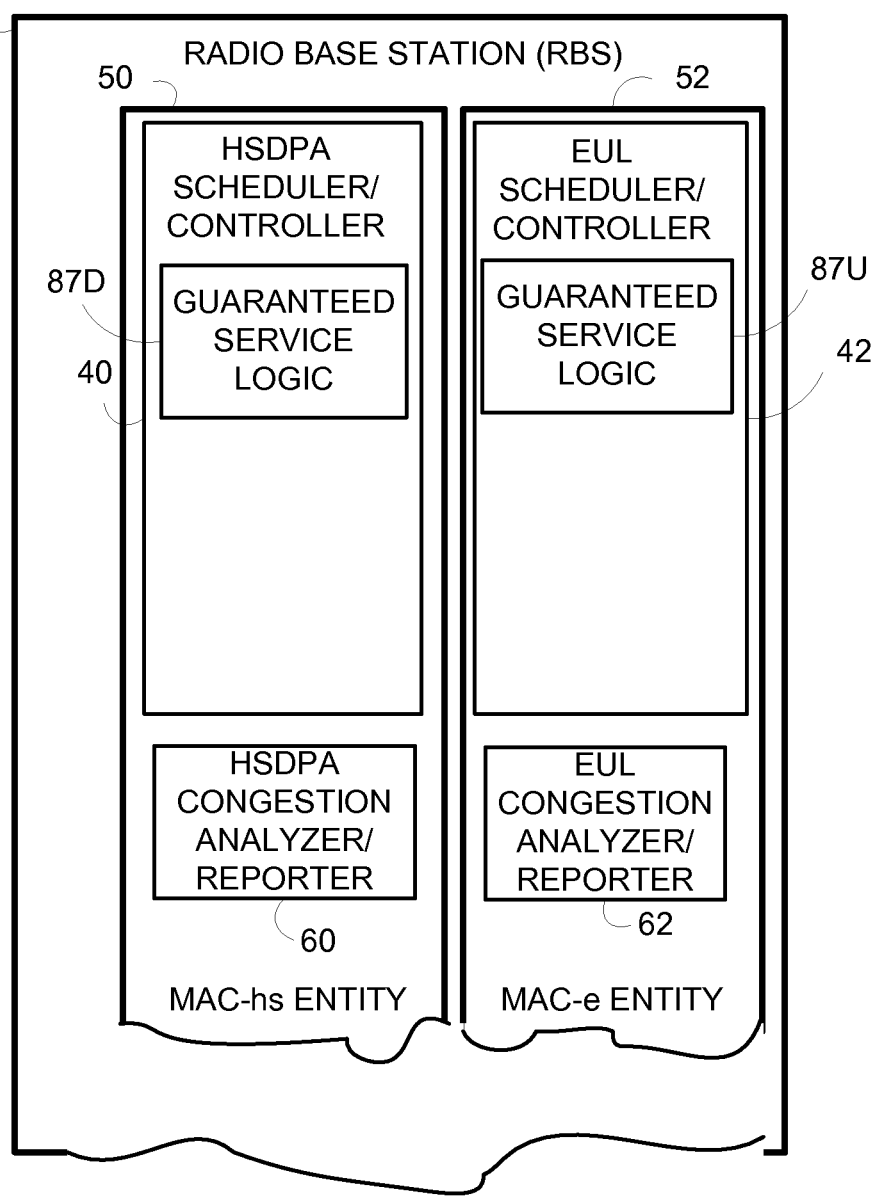
FIG. 3 is a diagrammatic view illustrating selected aspects of a radio base station including some aspects involved in the provision of guaranteed service(s) on a high speed packet access channel.

FIG. 3 illustrates, in somewhat more detail, further aspects of MAC-hs entity 50 and MAC-hs entity 52, and particularly of HSDPA scheduler/controller 40 and EUL scheduler/controller 42, that facilitate, e.g., the provision of guaranteed service(s) on the high speed packet access channel. In particular, FIG. 3 shows that HSDPA scheduler/controller 40 comprises HSDPA guaranteed service logic 87D and that EUL scheduler/controller 42 comprises EUL guaranteed service logic 87U. The HSDPA guaranteed service logic 87D keeps track of which connections using HSDPA are associated with guaranteed service(s) and protects the resources allocated to those connections. Likewise, the EUL guaranteed service logic 87U keeps track of which connections using EUL are associated with guaranteed service(s) and protects the resources allocated to those connections.

Concerning now operation of the HS-DSCH generally, the data which is to be sent on the high-speed downlink shared channel (HS-DSCH) over the air interface 32 to the mobile terminal 30 is obtained in protocol data units (PDUs) from radio network controller (RNC) 26 via RNC interface 70 and stored in the priority queues Q of HSDPA flow controller 80 (see FIG. 2). The PDUs are distributed to the appropriate one of the queues in HSDPA flow controller 80 by a demultiplexer type functionality 88, under control of HSDPA scheduler/controller 40. In some implementations, the distribution into queues of HSDPA flow controller 80 is based on the type of service to which the packet belongs (e.g., representative guaranteed service (GS) 82 or representative non-guaranteed service (NGS) 84), and in some implementations the distribution is further based on priority level, e.g., into various queues such as queue 85 or queue 86 based on priority level. The PDUs are applied to HSPDA channel formatter/encoder 89 under control of HSDPA scheduler/controller 40. In HSPDA channel formatter/encoder 89 the PDUs are formatted or assembled into data frames for transmission by HSDPA transceiver 72 over air interface 32. Plural PDUs may be included in each high-speed downlink shared channel (HS-DSCH) data frame.

The channel monitor 78 of radio base station 28 monitors for the channel quality (CQI) of the high-speed downlink shared channel (HS-DSCH). The channel quality (CQI) is reported by the mobile terminal (MT) 30. Knowing from the monitor the carrier quality of the HS-DSCH, the base station sends (to radio network controller (RNC) 26) messages which authorize radio network controller (RNC) 26 to send more HS-DSCH data frames to the radio base station 28.

In the illustrated example implementation of FIG. 2, on the uplink the frames of the EUL are received by EUL transceiver 74 and are applied to EUL channel deformatter/decoder 90. The information contained in the uplink frames that pertains to signaling is handled by signal handler 91. The user data packets obtained from the uplink frames are applied to packet handler 92. The packet handler 92 includes a queue structure similar to that of HSDPA flow controller 80, with some queues belong to the representative guaranteed service (GS) 82 and other queues belonging to the representative non-guaranteed service (NGS) 84. Thus, in some example implementations the EUL channel deformatter/decoder 90 distributes uplink data packets into the queues of packet handler 92 based on the type of service to which the packet belongs (e.g., the representative guaranteed service (GS) 82 or the representative non-guaranteed service (NGS) 84), and in some implementations the distribution is further based on priority level, e.g., into various queues such as queue 95 or queue 96 based on priority level. In this regard, in similar manner as with HSDPA flow controller 80, the plural queues Q of packet handler 92 include queue 95 representing (for each service) a highest priority queue and queue 96 representing (for each service) a lowest priority queue. Although not illustrated, plural intermediate queues for intermediate priority levels can also be provided.

Under control of EUL scheduler/controller 42, user data packets from the queues Q of packet handler 92 are extracted in appropriate order and timing via multiplexer 97 for application to RNC interface 70. From RNC interface 70 the packets are applied across the Iub interface to radio network controller (RNC) 26.

The MAC-hs entity 50 and MAC-hs entity 52 can also include other structures and/or functionalities. For example, MAC-hs entity 52 can include an EUL DL control information logic unit 98 for generating control signals for the EUL which may be applied on the downlink.

The radio base station (RBS) 28 can take autonomous scheduler actions when congestion is encountered on a high speed packet access channel, but at some points the radio base station (RBS) 28 needs to inform/request that the radio network controller (RNC) 26 reconfigure, e.g., reconfigure the connections and resources for the high speed packet access channel. Three basic methods of informing/requesting that the radio network controller reconfigure are providing:

1 "Periodic" load information, possibly started prior to at the onset of congestion.
2 An indication of congestion at occurrence of congestion, providing load information
3 An indication of congestion at occurrence of congestion, and also providing an indication of a cause of congestion and/or a proposed or recommended action to alleviate the congestion.

Alternative 3 provides the required information with the least signalling, and is further discussed subsequently with reference to FIG. 11, for example.

Congestion can be detected in many ways, based on parameters transferred in NBAP or stored locally. Load and congestion indicators are typically dependent on the scheduler algorithms, which are vendor-specific. Hence, congestion detection algorithms are generally vendor-specific.

Congestion can occur per cell, e.g. transmit (TX) power, or cell group, e.g. transmission links in a main-remote configuration of one NodeB. It may be preferred to report per these entities. Also congestion can occur separately in the uplink and downlink and the reconfiguration actions taken by the radio network controller (RNC) will typically be different as a result of the cause of the congestion. Hence, as hereinafter explained, there can be congestion reporting for four separate groups.

As the load situation continuously changes, new congestion events may add, while existing ones are still unresolved. Examples are:
  there is downlink power congestion for HSDPA Conversational traffic and later the uplink noise rise becomes too high to serve the EUL Conversational traffic demand.
  Initially the HSDPA Interactive traffic does not meet the minimum capacity dimensioned by the operator. Later the load increases and Conversational traffic cannot be adequately served either.

Thus, in at least some situations, there may be a need to identify more than one simultaneous event.

As indicated above, MAC-hs entity 50 includes HSDPA congestion analyzer/reporter 60 and MAC-hs entity 52 includes EUL congestion analyzer/reporter 62. As optional features, the radio base station (RBS) 28 may further comprise a HSDPA downlink reporter 100 which consolidates reports from the HSDPA congestion analyzer/reporters 60 of the various cells served by radio base station (RBS) 28 (e.g., cell 1 through cell J), and/or an EUL uplink reporter 102 which consolidates reports from the EUL congestion analyzer/reporters 62 of the various cells served by radio base station (RBS) 28.

Figure 4C:
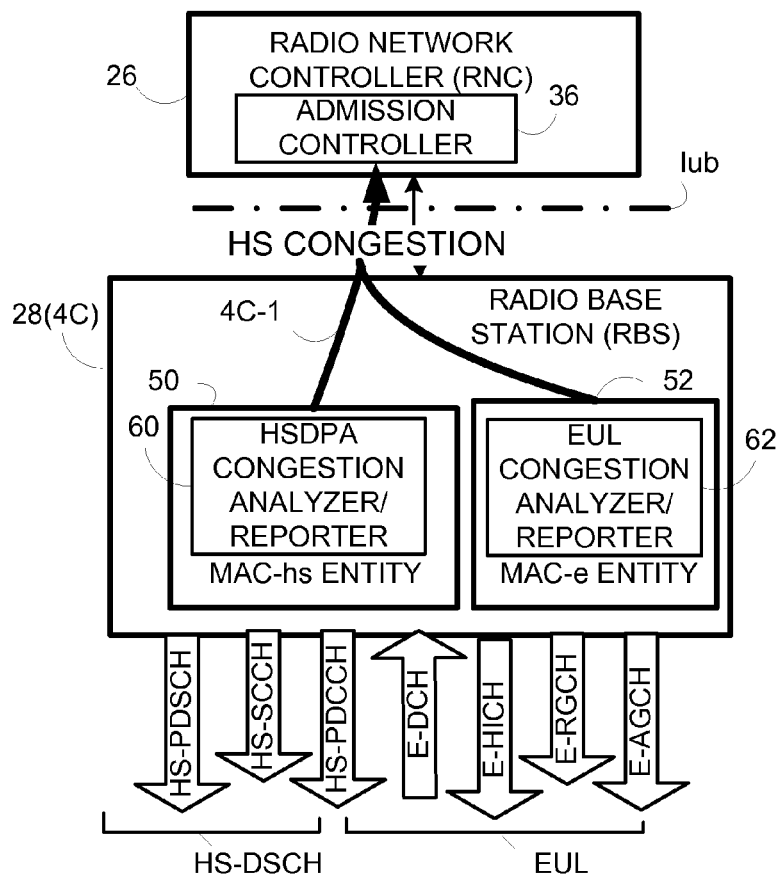

According to a non-limiting aspect of the technology, the radio base station is configured to determine and to report the load/congestion (e.g., overload congestion) of a high speed packet access channel. As illustrated by message 4A-1 in FIG. 4A, the radio base station (RBS) 28(4A) can detect and report (e.g., via HSDPA congestion analyzer/reporter 60) the load/congestion of the high speed downlink shared channel. As illustrated by message 4B-1 in FIG. 4B, the radio base station (RBS) 28(4B) can detect and report (e.g., via EUL congestion analyzer/reporter 62) the load/congestion of the high speed uplink shared channel. As illustrated by message 4C-1 in FIG. 4C, the radio base station (RBS) 28(4C) can detect and report (e.g., HSDPA congestion analyzer/reporter 60 and via EUL congestion analyzer/reporter 62) the load/congestion of the high speed downlink shared channel and the load/congestion of the high speed uplink shared channel. Thus, the radio base station is configured to determine and to report the load/congestion of a high speed downlink shared channel or of a high speed uplink packet access channel, or both a high speed downlink shared channel and a high speed uplink packet access channel (as shown in FIG. 4C).

Figure 4D:
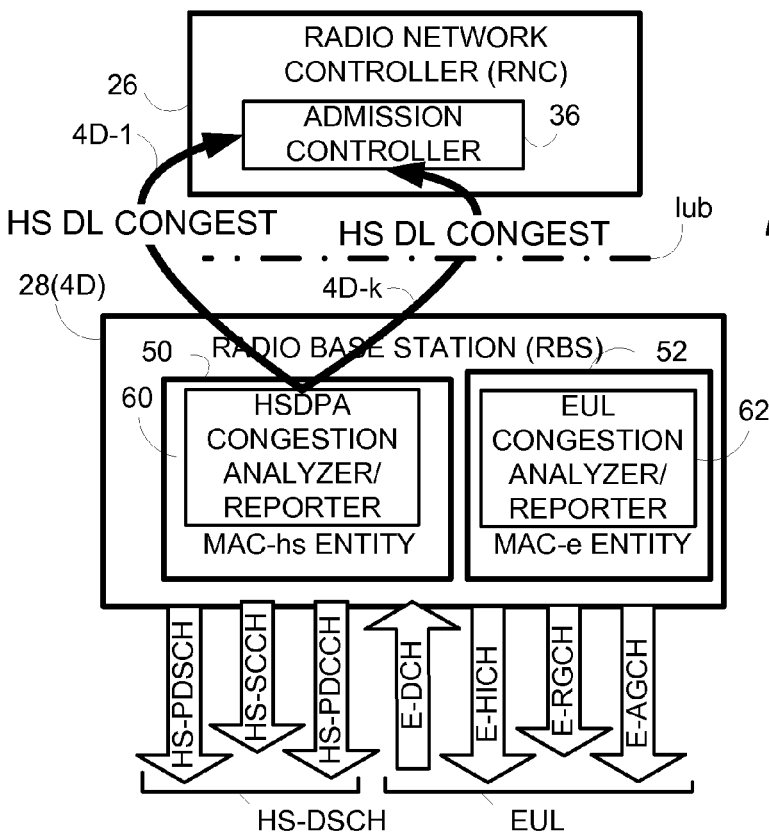

FIG. 4D illustrates an example embodiment in which the radio base station is configured to determine and to report multiple congestion situations ongoing in nodeB. For example, message 4D-1 of FIG. 4D indicates reporting of a first congestion situation, while message 4D-k of FIG. 4D indicates reporting of a $k^{th}$ congestion situation. The multiple congestion situations can start and stop independently. Although the multiple congestion situations in FIG. 4D happen to be illustrated as load/congestion of the high speed downlink shared channel (e.g., via HSDPA congestion analyzer/reporter 60), it will be appreciated that the multiple congestion situations can also comprise multiple congestions on the high speed uplink shared channel (e.g., via EUL congestion analyzer/reporter 62), or a combination of congestion situations on the high speed downlink shared channel and the high speed uplink shared channel. As explained hereinafter, the radio network controller (RNC/CRNC) can use the combination of causes of congestion to undertake the proper set of actions to re-allocate the resources The example implementations depicted in FIG. 4A-FIG. 4D are combinable with other embodiments described herein, including but not limited to various embodiments which illustrate or describe reasons or remedies for congestion situations.

Figure 5A:
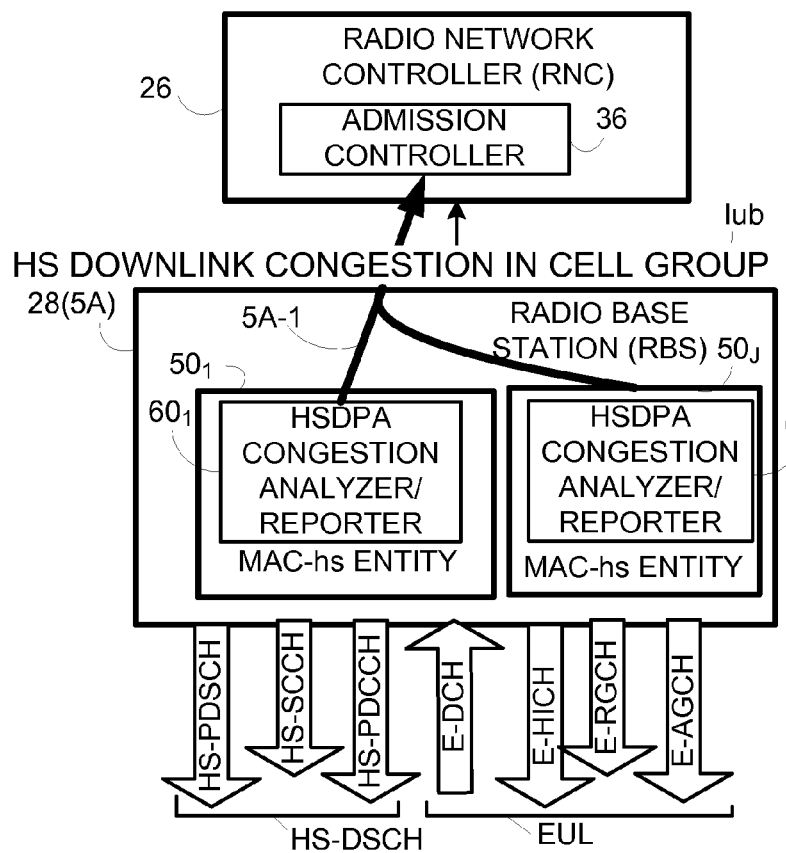
FIG. 5A-FIG. 5B are diagrammatic views showing portions of a radio access network for depicting generation and transmission of a congestion message for a high speed packet access channel as detected in a local cell group.

In the example implementations depicted in FIG. 4A-FIG. 4D, the radio base station (RBS) detects and reports the load/congestion of a high speed packet access channel for a (single) cell served by the radio base station. In the example implementations depicted in FIG. 5A-FIG. 5C, on the other hand, the radio base station (RBS) 28 detects and reports the load/congestion of a high speed packet access channel for a cell group served by the radio base station. For example, FIG. 5A shows message 5A-1 reporting downlink load/congestion for a local cell group comprising at least some cells of cell 1 through cell J shown in FIG. 2. For simplicity, FIG. 5A shows the MAC-hs entity $50_1$ and the HSDPA congestion analyzer/reporter $60_1$ for cell 1 and the MAC-hs entity $50_J$ and the HSDPA congestion analyzer/reporter $60_J$ for cell J (omitting illustration of the still-present MAC-hs entities of the cells). The congestion of the reports from the cells of the cell group can be combined by a unit such as HSDPA downlink reporter 100 (see FIG. 2) or a designated one of the HSDPA congestion analyzer/reporters 60, or by RNC interface 70, for example, and sent as a single message 5A-1 to radio network controller (RNC) 26.

Figure 5B:
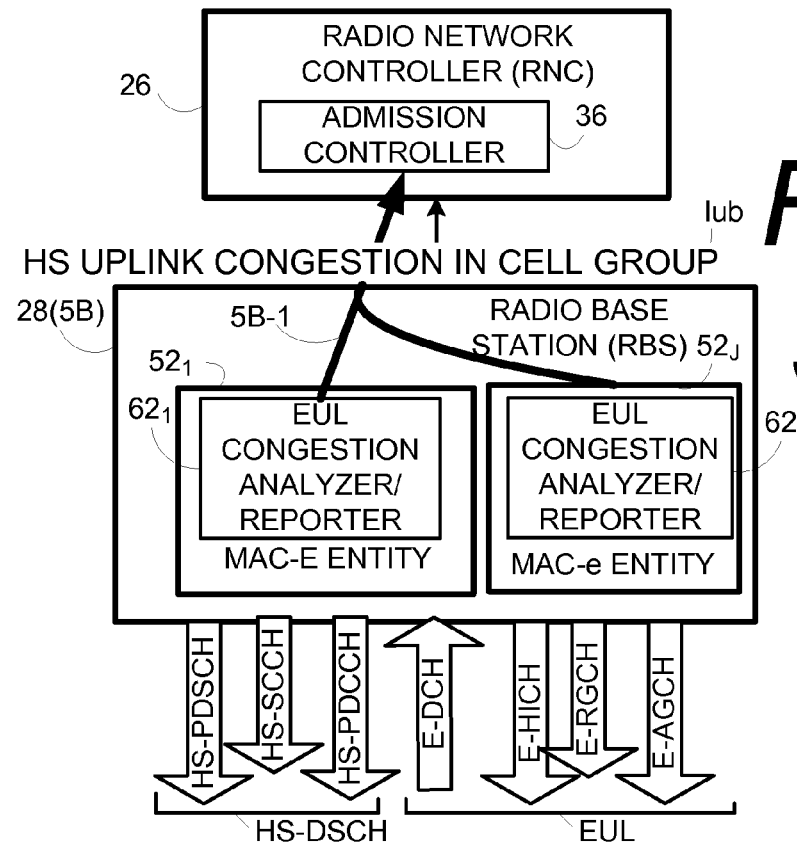

In similar manner, FIG. 5B shows message 5B-1 reporting uplink load/congestion for a cell group comprising at least some cells of cell 1 through cell J shown in FIG. 2. Again for simplicity, FIG. BA shows the MAC-hs entity $52_1$ and EUL congestion analyzer/reporter $62_1$ for cell 1 and MAC-hs entity $52_J$ and EUL congestion analyzer/reporter $62_J$ for cell J (omitting illustration of the still-present MAC-hs entities of the cells). The congestion of the reports from the cells of the local cell group can be combined by a unit such as EUL uplink reporter 102 (see FIG. 2) or a designated one of the EUL congestion analyzer/reporters 62, or by RNC interface 70, for example, and sent as a single message 5B-1 to radio network controller (RNC) 26.

It will be appreciated, in essentially similar manner as described with reference to FIG. 4D, that messages concerning multiple congestion situations in plural cell groups are also encompassed by the technology, and that the example implementations depicted in FIG. 5A-FIG. 5B and variations thereon are combinable with other embodiments described herein, including but not limited to various embodiments which illustrate or describe reasons or remedies for congestion situations.

In differing or combined implementations, the radio base station 28 can be configured to determine and to report load/congestion on the channel for the guaranteed service (e.g., representative guaranteed service (GS) 82) and/or for the non-guaranteed service (e.g., representative non-guaranteed service (NGS) 84). Since either or both of the guaranteed service and the non-guaranteed service can have plural priority classes or levels, reporting of load/congestion, for the guaranteed service and/or the non-guaranteed service, can optionally be on a priority class or priority level basis, such as allocation/retention priority, for example.

Thus, in some embodiments, the radio base station (RBS) can detect a congestion situation on HSDPA for both a guaranteed service and a non guaranteed service. The main symptom of the congestion situation is a long delay of the MAC-d PDU in the priority queue Q of HSDPA flow controller 80. The delay occurs by reason of lack of sufficient resource, i.e. lack of available HSDPA power and code. So in order to detect a congestion situation, the HSDPA congestion analyzer/reporter 60 can monitor several things such as, for example, how much the MAC-d PDU in the priority queue Q has been delayed, how many priority queues are in the RBS, and how much power each service consumes. The definition of congestion situation is different between guaranteed service and non-guaranteed service, as explained below.

For a guaranteed service (e.g., representative guaranteed service (GS) 82), the congestion situation is defined as a case when a parameter tDelta is less than a parameter congThresholdGs. The parameter tDelta is defined as a time difference between the actual delayed time and the maximum allowed delay. The actual delayed time is measured from the time when MAC-d PDU arrives in the priority queue to the time when the same MAC-d PDU leaves from the priority queue. The maximum allowed delay is decided depending on the service type. The parameter congThresholdGs is a certain threshold that controls how fast congestion situation can be detected for the guaranteed service.

For a non-guaranteed service (e.g., representative non-guaranteed service (NGS) 84), the congestion situation is defined as a case when the following two conditions are met. The first condition is that the consumed power for non-guaranteed service is less than a parameter minPowerNonGs. The second condition is that a parameter numberPqNonGs is equal to or more than the parameter CongThresholdNonGs. The parameter minPowerNonGs is defined as reserved power for non guaranteed service such as interactive and background. The parameter numberPqNonGs is defined as an averaged number of non guaranteed service priority queue that is not selected for the transmission on HSDPA channel even if it has at least one MAC-d PDU in priority queue. The parameter CongThresholdNonGs is a certain threshold that controls how fast congestion situation can be detected for the non guaranteed service. Once congestion situation is detected (e.g., by HSDPA congestion analyzer/reporter 60) according to the mechanism described above, the radio base station (RBS) 28 can take a proper action to resolve the congestion situation.

Figure 6:
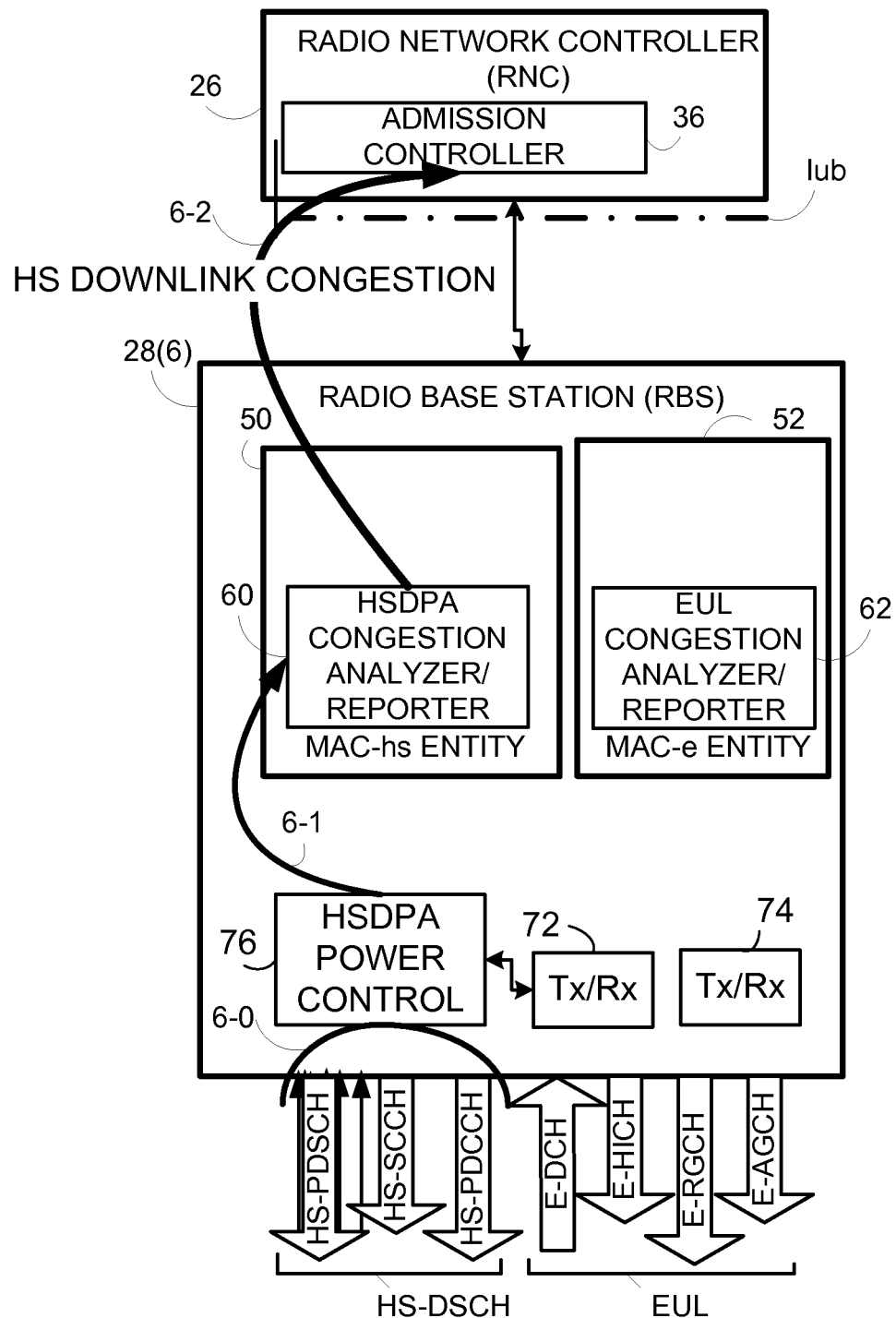
FIG. 6 is a diagrammatic view showing portions of a radio access network for depicting generation and transmission of a congestion message for a high speed packet access downlink channel based on congestion determined on the basis of used downlink power.

In accordance with another aspect of the technology, in example embodiments and modes wherein the channel is a HS-DPA channel, the radio base station can be configured to determine and to report the load/congestion by measuring used downlink power for the HSDPA channel. In this regard, FIG. 6 shows an example embodiment wherein the used downlink power for the HSDPA channel (depicted by line 6-0) is measured by HSDPA power controller 76 and reported by signal or message 6-1 to HSDPA congestion analyzer/reporter 60. If the HSDPA congestion analyzer/reporter 60 determines that the used downlink power for the HSDPA channel indicates a congestion situation, the HSDPA congestion analyzer/reporter 60 sends a congestion message 6-2 to radio network controller (RNC) 26. While FIG. 6 represents a simple case of evaluating used downlink power for the high speed shared downlink channel to detect congestion, it will be appreciated that the technology encompasses more complex and sophisticated scenarios. For example, the measuring of the used downlink power can be either for a guaranteed service (e.g., representative guaranteed service (GS) 82), a non-guaranteed service (e.g., representative non-guaranteed service (NGS) 84), or both. Further, for the guaranteed service and/or the non-guaranteed service, measuring of the used downlink power can optionally be on a priority class basis.

Figure 7:
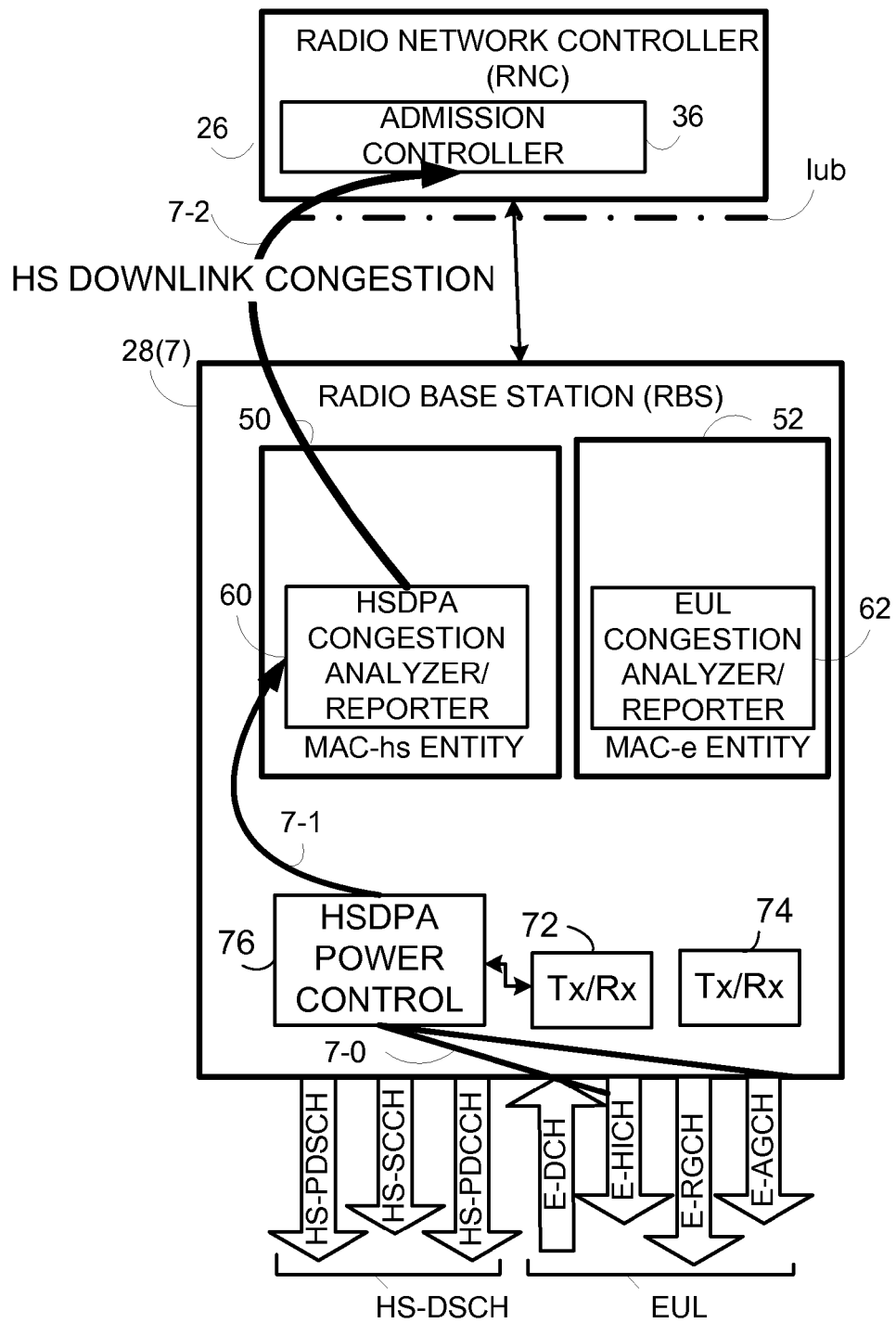
FIG. 7 is a diagrammatic view showing portions of a radio access network for depicting generation and transmission of a congestion message for congestion determined on the basis of used downlink power consumed by uplink control channel(s) for a high speed uplink packet access channel.

In accordance with yet another aspect of the technology and other example embodiments and modes wherein the channel is a downlink channel, the radio base station is configured to measure and to report downlink power utilized on the downlink channel by control channels (provided on the downlink) of a high speed uplink packet access channel. In this regard, FIG. 7 shows an example embodiment wherein the used downlink power for the uplink control channels (depicted by line 7-0) is measured by HSDPA power controller 76 and reported by signal or message 7-1 to HSDPA congestion analyzer/reporter 60. If the HSDPA congestion analyzer/reporter 60 determines that the used downlink power for the HSDPA channel indicates a congestion situation, the HSDPA congestion analyzer/reporter 60 sends a congestion message 7-2 to radio network controller (RNC) 26. The high speed uplink packet access channel can be an E-DCH channel and the control channels used in the downlink for the E-DCH can be one or more of the E-HICH, E-RGCH, and E-AGCH channels. Further, in implementations wherein at least some of the resources for the channel are allocated to support a guaranteed service and at least some resources are allocated to support a non-guaranteed service, the radio base station can be configured to measure and to report the downlink power utilized on the downlink channel by the uplink control channels of the high speed uplink packet access channel for the guaranteed service, for the non-guaranteed service, or both. Further, for the guaranteed service and/or the non-guaranteed service, the measuring and reporting of the downlink power utilized on the downlink channel by the uplink control channels of the high speed uplink packet access channel can optionally be on a priority class basis.

Figure 8:
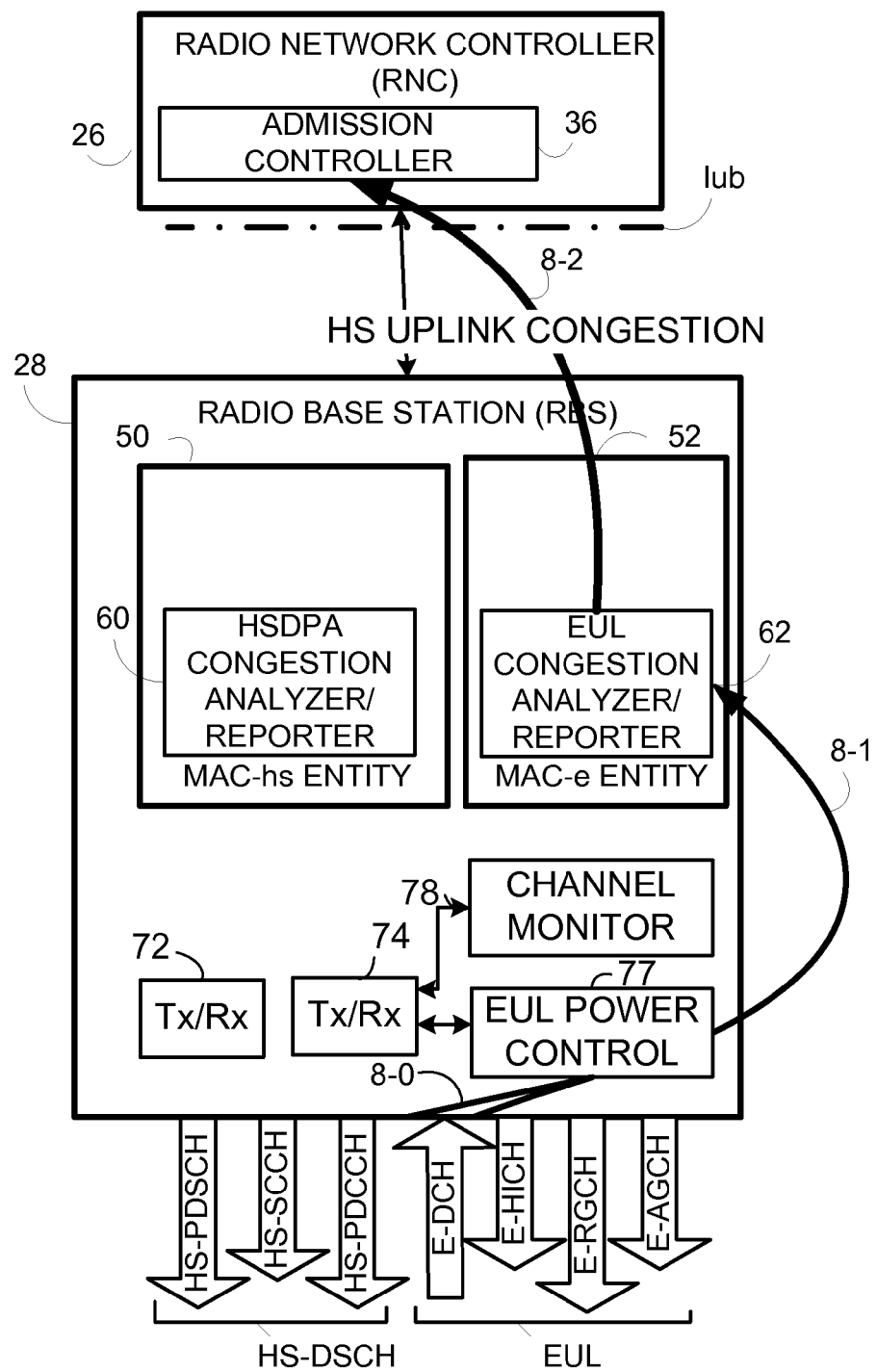
FIG. 8 is a diagrammatic view showing portions of a radio access network for depicting generation and transmission of a congestion message for congestion determined on the basis of received uplink power for a high speed uplink packet access channel.

In accordance with still another non-limiting aspect of the technology, in example embodiments and modes wherein the channel is a high speed uplink packet access channel, the radio base station can be configured to determine and to report the load/congestion by measuring received uplink power for the channel. In this regard, FIG. 8 shows an example embodiment wherein the received link power for the high speed uplink packet access channel (depicted by line 8-0) is measured by EUL power controller 77 and reported by signal or message 8-1 to EUL congestion analyzer/reporter 62. If the EUL congestion analyzer/reporter 62 determines that the received uplink power for the EUL channel indicates a congestion situation, the EUL congestion analyzer/reporter 62 sends a congestion message 8-2 to radio network controller (RNC) 26. The measuring of the received uplink power can be either for a guaranteed service, a non-guaranteed service, or both. Further, for the guaranteed service and/or the non-guaranteed service, measuring of the received uplink power can optionally be on a priority class basis.

Typically and traditionally, a high speed packet access channel such as HSDPA and EUL support only interactive or background traffic, e.g., non-guaranteed services. As mentioned above, in some example embodiments and implementations of the present technology it is possible to have a guaranteed service on a high speed packet access channel, such as the representative guaranteed service (GS) 82. Yet if guaranteed services are allowed to operate on a high speed packet access channel, it may be advantageous to afford some measure of protection or assurance that at least some measure of non-guaranteed services will able to continue or take advantage of the high speed packet access channel. Thus, in accordance with yet another non-limiting aspect of the technology, at least one of the radio network controller and the radio base station is configured to set a reserved resource level for the non-guaranteed service.

Figure 9:
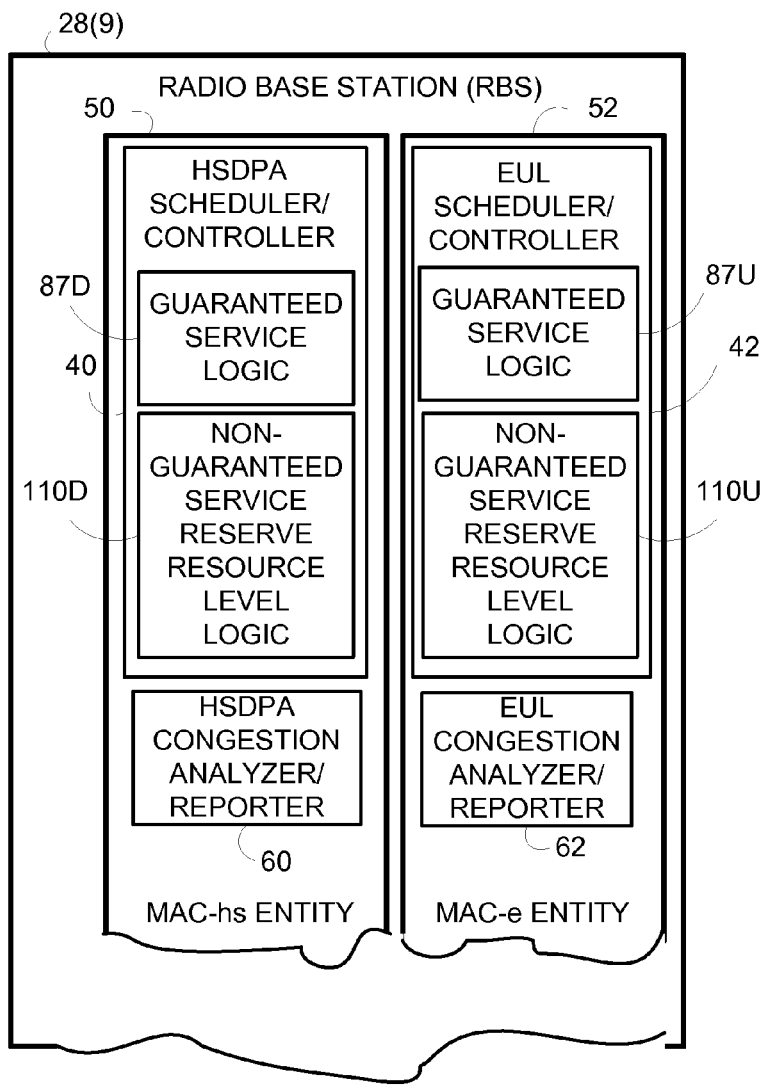
FIG. 9 is a diagrammatic view illustrating selected aspects of a radio base station including some aspects involved in the provision of a reserved resource level for non-guaranteed service(s) on a high speed packet access channel.

FIG. 9 illustrates selected aspects of a radio base station 28(9) including some aspects involved in the provision of a reserved resource level for non-guaranteed service(s) on a high speed packet access channel. In particular, FIG. 9 shows that HSDPA scheduler/controller 40 includes, in addition to HSDPA guaranteed service logic 87D, non-guaranteed service reserved resource logic 110D. Similarly, FIG. 9 shows that EUL scheduler/controller 42 includes, in addition to EUL guaranteed service logic 87U, non-guaranteed service reserved resource logic 110U.

Figure 10:
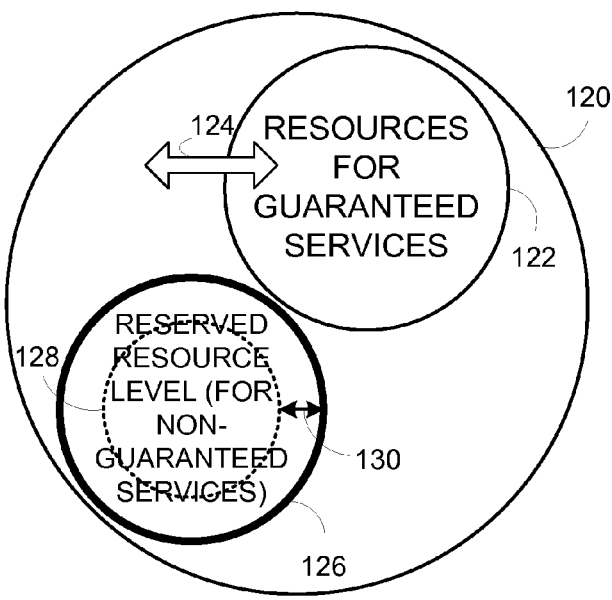
FIG. 10 is a diagrammatic view showing allocation of resources of a high speed packet access channel, and particularly illustrating operation of non-guaranteed service reserved resource level.

FIG. 10 partially depicts operational functionality of the non-guaranteed service reserved resource logic 110 for a high speed packet access channel. In FIG. 10, circle 120 represents the set of resources presently allocatable for the high speed packet access channel (either HSDPA or EUL). Circle 122 represents the subset of resources which are allocatable to one or more guaranteed service(s). As indicated by arrow 124, the diameter of circle 122, and thus the subset of resources which are allocatable to one or more guaranteed service(s), can be dynamic, e.g., can change by increasing or decreasing in accordance with the varying demand of the guaranteed service(s). In order to afford some measure of protection to the non-guaranteed service(s), the non-guaranteed service reserved resource logic 110 ensures that a further subset of resources (illustrated by circle 126) remains reserved for the non-guaranteed service(s).

In some example implementations having the aspect of reserved resource level for non-guaranteed service(s), users of the non-guaranteed service are assured use of resources up to the reserved resource level of resources. Broken line circle 128 in FIG. 10 represents an actually used level (e.g., "an actual level") of reserved resources utilized by the user(s) of the non-guaranteed service. The reserved resource level depicted by circle 128 represents a "soft" threshold in the following sense: When there is a differential amount (indicated by arrow 130) of reserved resources between the reserved resource level and an actually used level (e.g., "an actual level") of reserved resources utilized by the user(s) of the non-guaranteed service, the radio base station is configured to allow another user of the cell to at least temporarily use at least some of the differential amount of reserved resources. Such another user can be, for example, a user of the guaranteed service (DCH) or a user of a non-high speed service.

Thus, as explained in conjunction with FIG. 9 and FIG. 10, as one of its aspects the present technology facilitates setting of a reserved resource level for non-guaranteed traffic. The reserved resource level may be a parameter set in the radio network controller (RNC) 26 and communicated to the radio base station over the Iub interface.

an estimate calculated in the radio network controller (RNC) 26 based on resource consumption by background traffic and interactive traffic mapped on HSDPA and communicated to the radio base station over the Tub interface.

a parameter set in/by the radio base station.

When there are non-guaranteed users in the cell which can use the reserved resource level, then those reserved resources will indeed be reserved for them. Otherwise the reserved resources will be available for other users in the cell (these other users may or may not include DCH users).

The foregoing is achieved by the radio base station reporting the downlink power used by the non-guaranteed services mapped on HSDPA while they are satisfied, up to a level indicated by a soft-reservation threshold, i.e.

Their reported used power is truncated to the soft-reservation threshold if the used power is greater than the soft-reservation threshold.

Their reported used power is equal to their actual used power if that power is less than the soft-reservation threshold In case they are not satisfied, instead of the used downlink power, the soft-reservation threshold is indicated.

The measurement can be reported by the radio base station per priority class and will be summed in the radio network controller (RNC) 26 to give a single amount of required power for services mapped on HSDPA. The HSDPA scheduler/controller 40 of the radio base station decides when a user is satisfied or not satisfied.

It will be appreciated that the soft-reservation threshold can, in some embodiments and implementations, be also used to reserve a minimum of resources for other service types on EUL/HSDPA, not just non-guaranteed services.

The soft-reservation mechanism described above is based on power measurements/reports. An alternative would be to use provided bit rate, e.g., reserving a provided bit rate. When the HSDPA/EUL users are unsatisfied, the provided bit rate reported to the radio network controller (RNC) 26 will drop. This drop can then trigger load rebalancing between DCH and HSDPA/EUL load.

According to one non-limiting aspect of the technology, the radio base station is further configured to indicate a cause or reason for the load/congestion. FIG. 11 illustrates selected aspects of a radio base station 28(11) including some aspects involved in providing a recommendation for dealing with congestion on a high speed packet access channel. In particular, radio base station (RBS) 28(12) includes, in its HSDPA congestion analyzer/reporter 60, HSDPA congestion cause determination unit or logic 140. Similarly, EUL congestion analyzer/reporter 62 can (optionally) include EUL congestion cause determination unit or logic 142. The congestion causes which can be determined and reported by HSDPA congestion cause determination unit 140 and/or EUL congestion cause determination unit 142 include one or more of the following (as non-limiting examples): (1) power and/or noise rise for a non-shared dedicated channel (e.g., DCH); (2) channelization code issues for the high speed packet access channel (e.g., lacking enough channelization codes); and/or (3) a hardware issue arising, e.g., at the NodeB.

Figure 11:
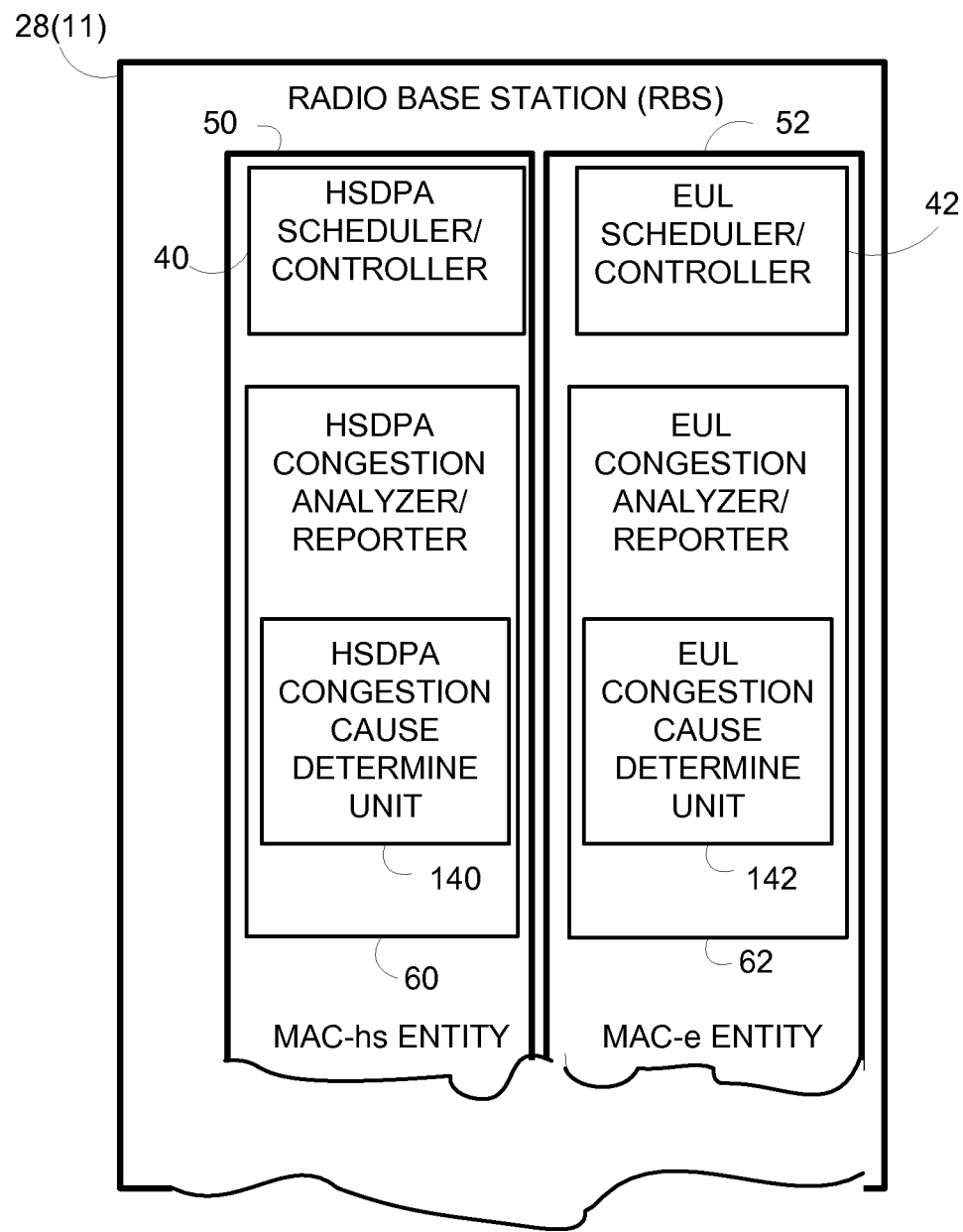
FIG. 11 is a diagrammatic view illustrating selected aspects of a radio base station including some aspects involved in providing an indication of congestion cause on a high speed packet access channel.

Thus, as exemplified by FIG. 11, in case congestion is detected by a NodeB, the NodeB sends a congestion indication towards the CRNC. The congestion indication provides cause information to indicate the reason for congestion. Such indication can be and preferably is provided separately for the uplink and the downlink. Moreover, it will be appreciated in the spirit of FIG. 4D that multiple congestion occurrences with multiple or different congestion reasons can be reported to the CRNC.

Example causes of congestion as determined by the radio base station (RBS) 28 (e.g., by functionalities such as example units 140 and/or 142 mentioned above) include one or more of the following: (1) lack of scheduling power; (2) lack of HS-SCCH codes; (3) lack of HS-DPSCH codes; (4) lack of scheduler hardware [HW] (e.g. hardware for scheduling in the downlink is lacking); and (5) lack of total hardware [HW] (e.g. hardware for support of R99 in the downlink is lacking, or hardware for both EUL and R99 in the uplink is lacking)

Figure 12:
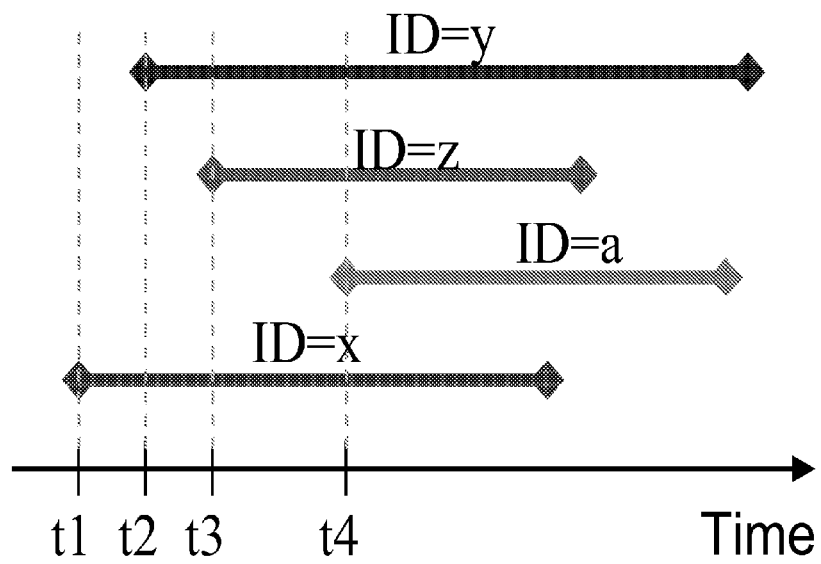
FIG. 12 is a diagrammatic view showing an example scenario of detection of cause(s) for congestion.

The congestion indication preferably allocates one congestion ID per congestion event, allowing different causes for congestion to be simultaneously "active" in the CRNC. For example, for four different congestion events each having unique congestion identifiers (IDs) and associated with times t1-t4, the causes could be as listed in example fashion below and as illustrated in FIG. 12.

t1: congestion ID=x, DLcause=lack of scheduling power
t2: congestion ID=y, DLcause=lack of HS-DPSCH codes
t3: congestion ID=z, ULcause=lack of total HW
t4: congestion ID=a, DLcause=lack of total HW The CRNC can take actions depending on the combination of causes indicated for all the active congestion IDs. In order to enable the CRNC to re-allocate resources in an efficient way, the congestion indication indicates the highest ARP priority level of the connection (or parts of congestion) suffering from the congestion situation. For example:

t1: congestion ID=x, suffering connection parts have highest ARP=3
t2: congestion ID=x, suffering connection parts have highest ARP=7
t3: congestion ID=x, suffering connection parts have highest ARP=15

ARP level 15 ('no priority') is proposed to be used to indicate the resolution of a congestion situation with a certain congestion ID, i.e. that a particular congestion situation has ceased.

The CRNC can take the causes and/or priorities, as indicated by the ARP priority level, into consideration in deducing a scheme or strategy for resolving a particular congestion situation or an overall approach for resolving as many congestion situations as possible.

As a complement or alternative to indication of the highest congested ARP level, the NodeB may indicate to the CRNC the specific connection (parts) which are proposed to be reduced to resolve the congestion. This reporting is similar to the RL CONGESTION INDICATION as defined in the RNSAP protocol. The two alternatives allow a flexible function allocation between NodeB and CRNC, to cater for evolution of standards and products.

Moreover, in the congestion report it is possible for the NodeB to indicate the specific user that is proposed to be targeted for action by the RNC, and also which part of that user's connection shall be targeted. For example, if the targeted user has a multi-RAB connection, the RBS can indicate the removal of one of the RABs.

Upon receiving from the NodeB an indication of the cause of congestion, the radio network controller (RNC) 26 is in a better position to alleviate the reported congestion. In embodiments and implementations which do not have HSDPA congestion cause determination unit 140 or EUL congestion cause determination unit 142 or comparable functionalities, the radio network controller (RNC) 26 makes its own determination regarding the cause of congestion, and thus also implements actions that the radio network controller (RNC) 26 deems curative of the supposed cause of congestion. In either event, RNC-initiated actions to alleviate congestion can include degrading (e.g., moving to a lower bit rate) one or more low priority users, or dropping low priority users, thereby freeing resources and thereby alleviating congestion.

Figure 13:
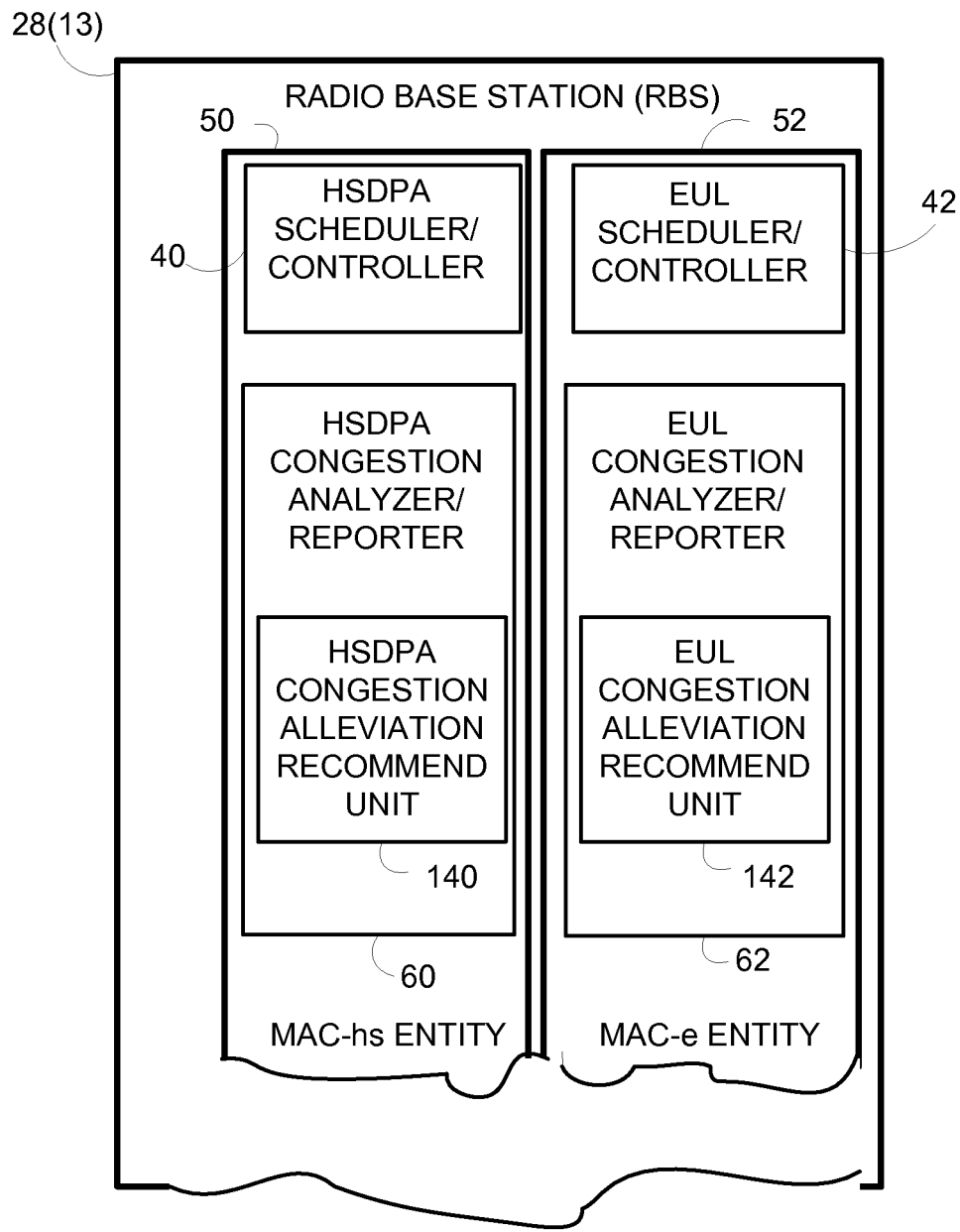
FIG. 13 is a diagrammatic view illustrating selected aspects of a radio base station including some aspects involved in providing a recommendation for dealing with congestion on a high speed packet access channel.

According to another non-limiting aspect of the technology, the radio base station is further configured to generate a recommended action for dealing with the load/congestion. FIG. 13 illustrates selected aspects of a radio base station 28(13) including some aspects involved in providing a recommendation for dealing with congestion on a high speed packet access channel. In particular, radio base station (RBS) 28(13) includes, in its HSDPA congestion analyzer/reporter 60, HSDPA congestion alleviation recommendation unit or logic 150. Similarly, EUL congestion analyzer/reporter 62 can (optionally) include EUL congestion alleviation recommendation unit or logic 152. The types of recommended action which can be proposed by HSDPA congestion alleviation recommendation unit 150 and/or EUL congestion alleviation recommendation unit 152 include one or more of the following: (1) reducing power and/or noise rise for a non-shared dedicated channel (e.g., DCH) and (2) adding a code for the high speed packet access channel (e.g., adding a code for a shared physical packet channel (HS-DPSCH) and/or a shared physical signaling channel (HS-SCCH)).

In embodiments and implementations which do not have HSDPA congestion alleviation recommendation unit 150 or EUL congestion alleviation recommendation unit 152 or comparable functionalities, the radio network controller (RNC) 26 makes its own decision for relieving congestion. Such RNC-initiated actions can include degrading (e.g., moving to a lower bit rate) one or more low priority users, or dropping low priority users, thereby freeing resources and thereby alleviating congestion.

It should be appreciated that logic and units such as guaranteed service logic 87, non-guaranteed service reserved resource logic 110, HSDPA congestion cause determination unit 140, EUL congestion cause determination unit 142, HSDPA congestion alleviation recommendation unit 150, and EUL congestion alleviation recommendation unit 152, for example, can in at least some example embodiments, be implemented, e.g., by a processor or controller as those terms are previously and expansively explained, and that such processor or controller can be separate, shared, or distributed, etc.

Congestion messages sent from a radio base station (RBS) to a radio network controller (RNC), such as the congestion messages described in the preceding embodiments or otherwise encompassed hereby, can be viewed as being part of a Node-B Congestion Procedure executed or performed by radio base station (RBS) 28, e.g., by the relevant MAC entity for the affected high speed packet access channel. This Node-B Congestion Procedure can be started when resource congestion is detected and the rate of one or more DCHs, corresponding to one or more radio links, is preferred to be limited in the uplink and/or the downlink. This Node-B Congestion Procedure is an autonomous indication sent by the NodeB can also be used to indicate to a controlling RNC (CRNC) any change of the UL/DL resource congestion situation, affecting these radio links. The Node-B Congestion Procedure can use the signalling bearer connection for the relevant UE Context.

When the NodeB, e.g., radio base station (RBS) 28, detects the start of a UL/DL resource congestion situation and prefers a reconfiguration of the currently allocated resources, the radio base station (RBS) 28 prepares and sends the NODE-B CONGESTION INDICATION message to the radio network controller (RNC) 26. The criteria for a congestion event are implementation-specific, only some of which having been explained herein by way of example. Various example situations and scenarios for the preparation and sending of the NODE-B CONGESTION INDICATION message have already been described with reference to previous embodiments.

In its preparation of the NODE-B CONGESTION INDICATION message, radio base station (RBS) 28 assigns a Congestion Indication ID (unique within each NodeB) to each congestion event. The radio base station (RBS) 28 can further report if the congestion is for one or more causes. To this end, the NODE-B CONGESTION INDICATION message 160 includes at least one of the information elements "UL cause" or "DL cause". As explained with reference to FIG. 11, for example, the radio base station (RBS) 28 may, for each congestion event and separately for HSDPA and EUL, report a congestion cause and/or proposed action (e.g., a recommended action to alleviate the congestion on the high speed shared channel). The radio base station (RBS) 28 can further (optionally) report if the congestion if the congestion affects a cell, a cell group, or both. Congestion may be informed for different channels, e.g., for HS-DSCH or for E-DCH, or both (and on either a per cell or cell group basis, for example). When receiving the NODE-B CONGESTION INDICATION message the CRNC may take action in accordance with the message contents and may forward the situation to relevant SRNCs. For example, the radio network controller (RNC) 26 should, when possible, take action in accordance with the reported cause of congestion.

Non-limiting examples of CRNC actions are RL release and transmission of RADIO LINK PREEMPTION REQUIRED INDICATION or RL CONGESTION INDICATION messages. If the Specific Target Information IE is received the CRNC should forward this information to the relevant SRNC(s). If the Congestion Scope Information IE is included then the CRNC should take action to reduce relevant resources.

Moreover, as explained with reference to FIG. 13, for example, the radio base station (RBS) 28 may optionally, for each congestion event and separately for HSDPA and EUL, report a proposed action (e.g., a recommended action to alleviate the congestion on the high speed packet access channel).

Figure 14A:
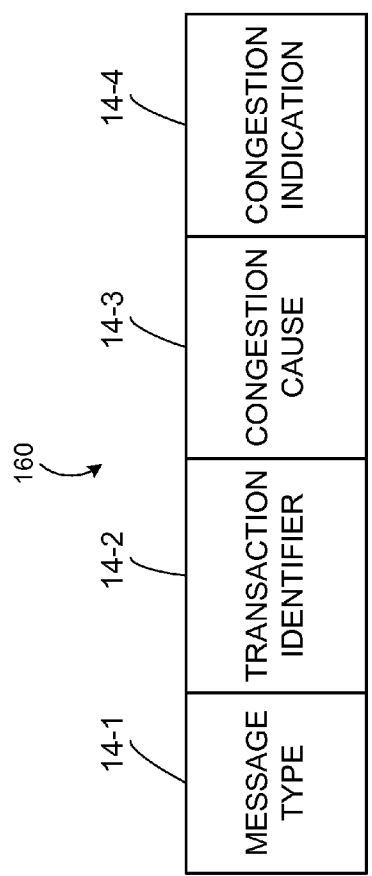
FIG. 14A is a diagrammatic view of an example NODE-B CONGESTION INDICATION message.

FIG. 14A depicts an example, non-limiting format of a representative NODE-B CONGESTION INDICATION message 160. The NODE-B CONGESTION INDICATION message is also known by other names, such as a GENERIC CONGESTION INDICATION message. The example NODE-B CONGESTION INDICATION message 160 of FIG. 14A includes one or more of the following fields or information elements (IE) (some of which are optional): message type information element 14-1; transaction identifier information element 14-2; congestion cause information element 14-3; congestion indication identifier information element 14-4. As a further option, and as shown in FIG. 14A, the NODE-B CONGESTION INDICATION message 160' can include recommended/proposed action information element 14-5.

The message type information element 14-1 uniquely identifies the message as being a NODE-B CONGESTION INDICATION message. The congestion indication identifier information element 14-4 identifies unambiguously an active congestion event reported by the radio base station (RBS) 28.

Other information elements of the NODE-B CONGESTION INDICATION message 160, and further information concerning the aforementioned information elements, are described by Table 1. Among the information elements of the NODE-B CONGESTION INDICATION message 160 is a Highest Congested Priority Class information element, which reports the lowest value (i.e., highest priority) of any class experiencing congestion. The parameter maxnoCongId represents a maximum number of ceased congestion identifiers. As understood from the foregoing, "priority class" or "priority level" encompasses allocation/retention priority.

The congestion cause information element 14-3 is further described by Table 4 and Table 5, and basically contains a value corresponding to a congestion cause which (for example) the congestion cause determination unit of the radio base station (RBS) 28 considers to be the likely cause for the congestion situation. The congestion cause can be proposed for each congestion event and separately for HSDPA (Table 5) and EUL (Table 4).

Figure 14B:
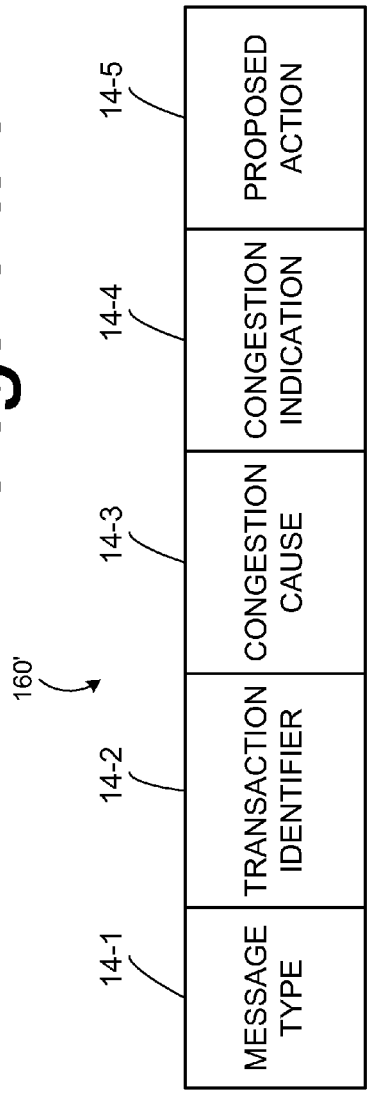
FIG. 14B is a diagrammatic view of another example NODE-B CONGESTION INDICATION message.

The optional proposed action information element 14-5 shown in FIG. 14B can contains a value corresponding to a suggested recommendation which the radio base station (RBS) 28 considers to be the best suitable action for reconfiguring in order to resolve the associated congestion situation. As mentioned before, the proposed or recommended action can be proposed for each congestion event and separately for HSDPA and EUL.

The radio base station (RBS) 28 can indicate any change of the UL/DL resource congestion situation by sending the NODE-B CONGESTION INDICATION message. The Node B may indicate a modification of congestion state either by (1) using a currently active Congestion ID IE in the latest GENERIC CONGESTION INDICATION message (e.g., NODE-B CONGESTION INDICATION message 160) and including updated Congestion Cause Information, Congestion Level Information or Specific Target Information; or (2) ending one Congestion ID and subsequently reporting a new Congestion ID. Preferably only major changes should be reported, when at least one of Congestion Cause Information, Congestion Level Information or Specific Target Information is changed.

A Node B shall indicate a ceased congestion state by sending a GENERIC CONGESTION INDICATION message (also known as the NODE-B CONGESTION INDICATION message 160) with Congestion ID of ceased congestion event and the Highest Congested Priority Level IE set to the value 15. The NodeB may omit the Congestion Cause Information IE only in a GENERIC CONGESTION INDICATION message indicating the end of a Congestion situation. The CRNC shall always send a response GENERIC CONGESTION INDICATION ACK message when detecting the reception of a GENERIC CONGESTION INDICATION message. If the message can be interpreted the Cause IE shall be set to TRUE, otherwise to FALSE.

The NodeB may repeat the same message. The CRNC may discard multiple identical messages.

In the foregoing it has been assumed that admission and congestion control are handled in the radio network controller 26, and that the radio base station performs fast scheduling using whatever resource is available at the time. Now following are discussions of ways of detecting congestion in the scheduler, such ways including use/detection of minimum bitrate, served and desired bitrates, unhappy user(s), and measurement reporting per scheduling priority.

All services, guaranteed or not, are given a minimum level of support. For guaranteed services, this is the Guaranteed Bitrate (GBR) currently defined in the relevant telecommunications standard. For non-guaranteed services, this is introduced in terms of a minimum or desired bitrate (DBR), below which the service is considered not satisfactory from the system point of view, e.g., per-user overhead is becoming too high.

The minimum or desired bitrate (DBR) is defined on a per-RAB (radio access bearer) basis and is sent by the radio network controller to the radio base station during RAB setup. An alternative is to provide the DBR on a priority-class basis so that the RNC does not need to send this information during every RAB setup.

The minimum or desired bitrate (DBR) can be used to gauge the QoS for non-guaranteed services by comparing it with the actually served bitrate (SBR). This is done by defining the served-to-desired bitrate ratio using Expression 1:

$$SDBR = SBR/DBR \qquad \text{Expression 1}$$

A similar ratio can be defined for guaranteed services by Expression 2:

$$SGBR = SBR/GBR \qquad \text{Expression 2}$$

These ratios can be measured in the radio base station for every user.

For EUL, there is an existing concept of an unhappy user, i.e., a user that can benefit from a higher rate. This concept can be extended easily to HSDPA by considering the buffer load and the delay. Unhappy users that are transmitting at a rate below the GBR or DBR are sure signs of overloading. The average value of the SDBR or SGBR for unhappy users is made available as NBAP common measurements, which can be subscribed by the radio network controller.

Because of the fundamental difference between guaranteed and non-guaranteed services, the measurements of the mean SDBR and mean SGBR must be made available separately. If, however, guaranteed and non-guaranteed services are always assigned different scheduling priorities, the distinction between the two is not needed and per-priority reporting will suffice.

Thus, a scheme that provides quantitative measures of the amount of overloading in EUL and HSDPA is proposed. The SDBR or desired-to-served bitrate ratios for unhappy users are measured in the RBS and the mean value per scheduling priority is made available as NBAP common measurements. With this scheme, the RNC can subscribe to the mean SDBR with, e.g., a 100 millisecond or 1 second periodicity. A value over 1 means users are well served. A value below 1 means users are not reaching the desired rate. For guaranteed services, the RNC needs to either free up some resource or remove some users in order to fulfill the contract.

For non-guaranteed services, the same concept can be extended to users on DCH channels. The radio network controller can then measure the same mean SDBR for users on DCH and compare it with the value for HSDPA/EUL users that has a similar priority. Informed decisions can then be made as to whether it is a DCH or an HSDPA/EUL user that should be downgraded or even pre-empted to make rooms for others.

Thus, the present technology provides, e.g., a radio base station (RBS) 28 capable of downlink load reporting (e.g., congestion on a high speed shared downlink channel such as HSDPA) and/or uplink load reporting (e.g., congestion on a high speed uplink packet access channel such as E-DCH).

By way of partial summary, for downlink load reporting, the radio base station (RBS) 28 can selectively or in combination report one or more of the following to the radio network controller (RNC) 26:

1) An HSDPA overload congestion indication which includes the type of resource it would benefit from, e.g., down link power, HS-SCCH code or HS-PDSCH code. This can be reported as one signal per cell.
2) An HSDPA overload congestion indication which per HSDPA priority class indicates if the guaranteed services of that priority class is congested, e.g., if their QoS can not be fulfilled. The radio base station can also provide such congestion indication, not only on the per priority class, but alternatively a single indication for all in the cell, e.g., where there is no discrimination between guaranteed service and non-guaranteed service.
3) An HSDPA overload congestion indication advising which per HSDPA priority class if the non-guaranteed services of that priority class is congested, e.g., that their QoS can not be fulfilled. The radio base station can also provide such congestion indication, not only on the per priority class, but alternatively a single indication for all in the cell, e.g., where there is no discrimination between guaranteed service and non-guaranteed service
4) An HSDPA downlink used power measurement per HSDPA priority class of the non-guaranteed services. The radio base station can also provide such downlink used power measurement, not only on the per priority class, but alternatively a single indication for all in the cell.
5) An HSDPA down link used power measurement of the power consumed by the EUL control channels used in the downlink for the E-DCH (E-HICH, E-RGCH, E-AGCH).

For the power measurements (4 & 5) it shall be possible to set filtration lengths in the same way as currently exist in 3GPP for the total carrier power.

Continuing the partial summary, for uplink load reporting, the radio base station (RBS) 28 can selectively or in combination report one or more of the following to the radio network controller (RNC):

6) A EUL scheduled data overload congestion indication which per EUL priority class indicates of the guaranteed services of that priority class is congested i.e. their QoS can not be fulfilled. The radio base station can also provide such congestion indication, not only on the per priority class, but alternatively a single indication for all in the cell.
7) A EUL scheduled data overload congestion indication which per EUL priority class indicates of the non-guaranteed services of that priority class is congested i.e. their QoS can not be fulfilled. The radio base station can also provide such congestion indication, not only on the per priority class, but alternatively a single indication for all in the cell.
8) A EUL scheduled data up link received power measurement per EUL priority class of the guaranteed services. The received power can be the absolute power or a relative nose rise value. The radio base station can also provide such congestion indication, not only on the per priority class, but alternatively a single indication for all in the cell.
9) A EUL scheduled data up link received power measurement per EUL priority class of the non-guaranteed services. The received power can be the absolute power or a relative nose rise value. The radio base station can also provide such congestion indication, not only on the per priority class, but alternatively a single indication for all in the cell.

For the power measurements (8 & 9) it shall be possible to set filtration lengths in the same way as currently exist in 3GPP for the total carrier power.

In the various example embodiments and implementations described herein, the technology improves system capacity and QoS handling of the system when supporting both non-guaranteed (interactive) and guaranteed service (e.g. VoIP) on HSDPA and at the same time DCH traffic. The technology facilitates taking correct load control actions in the radio network controller, e.g., avoiding releasing traffic when no gain is achieved from that action.

The technology also enables an operator to avoid starvation of HSDPA interactive/background traffic at high load, without loosing capacity of guaranteed traffic (Speech/VoIP) when the interactive/background traffic on HSDPA is low.

The technology also enables the operator to avoid starvation of HSDPA interactive/background traffic at high load, without limiting resource availability for services other than non-guaranteed services mapped on HSPA when the interactive/background traffic on HSPA is low.

Thus, in its various embodiments and implementations, the technology described herein, improves, e.g., resource estimation and reporting from the radio base station to the radio network controller to enable accurate and efficient resource control in the RNC when HSDPA is used in the system. Such reporting and resource control facilitates and supports guaranteed services on HSDPA and EUL and also enables, in some example embodiments, an efficient resource reservation for interactive/background traffic on HSDPA and EUL.

Further, in its various embodiments and implementations, the technology described herein introduces a generic congestion reporting mechanism in the Node B Application Part (NBAP), aiming to allow the NodeB to indicate the detection of internal resource congestion and indicating efficient resolving actions to the CRNC. (NBAP is the application protocol used between the RNC (Radio Network Controller) and the Node B. NBAP is used to configure and manage the Node B and setup channels on the Iub and Uu interfaces). The CRNC can react on this congestion indication by requesting reduction of the rate of connection (-parts) or the release of (parts of) connections towards the SRNC. The reporting optionally also allows the NodeB to indicate directly which (part of) connections should be targeted in case resource congestion occurs. Advantageously, the existing RNSAP mechanism, i.e. RADIO LINK PREEMPTION REQUIRED INDICATION and RL CONGESTION INDICATION, are not changed and can interwork well with the proposed new NBAP mechanisms.

By way of further background, High Speed Downlink Packet Access (HSDPA) is also discussed in one or more of the following (all of which are incorporated by reference herein in their entirety):

U.S. patent application Ser. No. 11/024,942, filed Dec. 30, 2004, entitled "FLOW CONTROL AT CELL CHANGE FOR HIGH-SPEED DOWNLINK PACKET ACCESS";

U.S. patent application Ser. No. 10/371,199, filed Feb. 24, 2003, entitled "RADIO RESOURCE MANAGEMENT FOR A HIGH SPEED SHARED CHANNEL";

U.S. patent application Ser. No. 11/292,304, filed Dec. 2, 2005, entitled "FLOW CONTROL FOR LOW BITRATE USERS ON HIGH SPEED DOWNLINK";

U.S. patent application Ser. No. 11/617,792, filed Dec. 29, 2006, entitled "ENHANCED PACKET SERVICE FOR TELECOMMUNICATIONS;

U.S. patent application Ser. No. 11/617,788, filed Dec. 29, 2006, entitled "ENHANCING COVERAGE FOR HIGH SPEED DOWNLINK PACKET ACCESS (HSDPA) CHANNEL"

PCT Patent Application PCT/SE2005/001247, filed Aug. 26, 2005;

PCT Patent Application PCT/SE2005/001248, filed Aug. 26, 2005.

Still by way of further background, E-DCH is also discussed in one or more of the following (all of which are incorporated by reference herein in their entirety):

U.S. Patent Publication US 2005/0249120;

U.S. patent application Ser. No. 11/035,021, filed Jan. 14, 2005, entitled "UPLINK CONGESTION DETECTION AND CONTROL BETWEEN NODES IN A RADIO ACCESS NETWORK";

U.S. Provisional Patent Application Ser. No. 60/659,429, filed Mar. 9, 2005, entitled "BLER MEASUREMENTS FOR OUTER-LOOP POWER CONTROL OF IDLE ENHANCED UPLINK CHANNELS";

U.S. Provisional Patent Application Ser. No. 60/750,068, filed Dec. 14, 2005, entitled "DPDCH DESPREADING-ON-DEMAND (DOD) FOR WCDMA";

U.S. Provisional Patent Application Ser. No. 60/804,687, filed Jun. 14, 2006, entitled "PACKET DISCARD TIMER FOR E-DCH".

U.S. patent application Ser. No. 11/536,119, filed Sep. 28, 2006, entitled "AUTONOMOUS TRANSMISSION FOR EXTENDED COVERAGE.

In the technology described herein, the nodeB is responsible for the monitoring of its internal resources and for providing the CRNC with generic congestion information, indicating the details of the congestion situation (e.g. cause, severity, etc.) to allow the CRNC to take proper actions to re-allocate the resources between services. Moreover, the technology includes the fact that shared channels, also the dedicated channel resources can be part of this concept. Other aspects include:

- The ability to have multiple congestion situations ongoing in nodeB and reported to the CRNC. They can start and seize independently. The CRNC uses the combination of causes to undertake the proper set of actions to re-allocate the resources
- The ability to indicate the severity of a congestion situation in terms of the allocation/retention priority level. This is a new usage of the ARP concept.
- The ability to use the ARP concept to take actions on a part of the connection carried by a RL instead of taking an action on the whole RL. This is a new usage of the ARP concept.
- The ability of nodeB to indicate part of connections on which congestion actions should be done (it is an optional part of the congestion indication).
- The methods of detecting congestion start/seize on shared channels.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed hereby.

TABLE 1

GENERIC CONGESTION INDICATION [FDD]

| IE/Group Name | Presence | Range | IE Type and Reference | Semantics Description | Criticality | Assigned Criticality |
|---|---|---|---|---|---|---|
| Message Type | M | | 9.2.1.46 | | YES | ignore |
| Transaction ID | M | | 9.2.1.62 | | — | |
| Congestion ID | M | | 9.2.2.yy | | — | |
| Congestion Scope Information | C-EndCongestionID | | | | | |
| >Local Cell Group Information | | 0 ... <maxLocalCellinNodeB> | | | | |
| >>Local Cell Group ID | M | | 9.2.1.38 | | | |
| >Local Cell Information | | 0 ... <maxLocalCellinNodeB> | | | | |
| >>Local Cell ID | | | 9.2.1.37A | | | |
| Congestion Cause Information | M | | | | | |
| >UL cause | O | | 9.2.2.zz | | — | |
| >DL cause | O | | 9.2.2.tt | | — | |
| Congestion Level Information | O | | | | | |
| >Highest Congested Priority Level | O | | 9.2.2.uu | | — | |

TABLE 1-continued

GENERIC CONGESTION INDICATION [FDD]

| | | | | | |
|---|---|---|---|---|---|
| Specific Target Information | O | | | | |
| NodeB Communication Context Information | O | 1 ... <maxnoofNodeBcommContexts> | | EACH | ignore |
| >Node B Communication Context ID | M | | 9.2.1.48 | — | |
| >HS-DSCH MAC-d Flow Specific Information | | 0 ... <maxnoofMACdFlows> | | EACH | ignore |
| >>HS-DSCH MAC-d Flow ID | M | | 9.2.1.31I | — | |
| >RL Information List | O | | | | |
| >>RL Information | O | 1 ... <maxnoofRLs> | | EACH | ignore |
| >>>RL ID | M | | 9.2.1.53 | — | |
| >>>DCH Rate Information | | 1 ... <maxnoofDCHs> | | EACH | ignore |
| >>>>DCH ID | M | | 9.2.1.20 | — | |
| >>>>Allowed Rate Information | O | | 9.2.1.aa | — | |
| >>>E-DCH MAC-d Flow Specific Information | | 0 ... <maxnoofEDCHMACdFlows> | | EACH | ignore |
| >>>>E-DCH MAC-d Flow ID | M | | 9.2.1.74 | — | |

Explanation

| Range bound | |
|---|---|
| maxLocalCellinNodeB | Maximum number of cells in the NodeB |
| maxnoofNodeBcommContexts | Maximum number of Node B Communication Contexts, which have specific target information |
| maxnoofRLs | Maximum number of radio links for one UE, which have specific target information |
| maxnoofDCHs | Maximum number of DCHs for one UE. |
| maxnoofMACdFlows | Maximum number of HS-DSCH MAC-d flows |
| maxnoofEDCHMACdFlows | Maximum number of E-DCH MAC-d flows, which have specific target information |
| Condition | |
| EndCongestionID | The IE shall be present if the Highest Congested Priority Level IE has a value in the range 0-14. The IE shall be absent if the Highest Congested Priority Level IE has a value of 15. |

TABLE 2

CONGESTION INDICATION ID
The Cell Parameter ID identifies unambiguously an active Congestion event reported from one NodeB. It is assigned by the NodeB. Congestion event can be stopped and then the Congestion Indication ID may be re-allocated to another Congestion event.

| IE/Group Name | Presence | Range | IE Type and Reference | Semantics Description |
|---|---|---|---|---|
| Congestion Indication ID | | | INTEGER(0 ... 4096, ...) | |

TABLE 3

HIGHEST CONGESTED PRIORITY LEVEL
The Highest Congested Priority Class IE reports the lowest value (i.e. highest priority) of any Allocation/Retention priority level experiencing congestion.

| IE/Group Name | Presence | Range | IE Type and Reference | Semantics Description |
|---|---|---|---|---|
| Priority Level | M | | INTEGER (0 ... 15) | This IE indicates the Allocation/Retention priority of the request. Usage: Value "0" means "Spare"; It shall be treated as a logical error if received. |

TABLE 3-continued

HIGHEST CONGESTED PRIORITY LEVEL
The Highest Congested Priority Class IE reports the lowest value (i.e. highest priority) of any Allocation/Retention priority level experiencing congestion.

| IE/Group Name | Presence | Range | IE Type and Reference | Semantics Description |
|---|---|---|---|---|
| | | | | Values between "1" and "14" are ordered in decreasing order of priority, "1" being the highest and "14" the lowest. Value "15" means "No Priority". |

TABLE 4

UL CAUSE
The UL Cause IE informs the CRNC about which resource shortage the NodeB considers the most important cause for the reported uplink congestion.

| IE/Group Name | Presence | Range | IE Type and Reference | Semantics Description |
|---|---|---|---|---|
| Uplink cause | M | | INTEGER (0 ... 255) | "0" = Any "1" = excessive received noise rise due |

TABLE 4-continued

UL CAUSE

The UL Cause IE informs the CRNC about which resource shortage the NodeB considers the most important cause for the reported uplink congestion.

| IE/Group Name | Presence | Range | IE Type and Reference | Semantics Description |
|---|---|---|---|---|
| | | | | to DCH traffic or interference "2" = lack of scheduler hardware "3" = lack of total hardware "4" to "255" = reserved |

TABLE 5

DL CAUSE

The DL Cause IE informs the CRNC about which resource shortage the NodeB considers the most important cause for the reported downlink congestion.

| IE/Group Name | Presence | Range | IE Type and Reference | Semantics Description |
|---|---|---|---|---|
| Downlink Cause | M | | INTEGER (0 ... 255) | "0" = Any "1" = lack of available HS-DSCH power "2" = lack of HS-DPSCH codes "3" = lack of HS-SCCH codes "4" = lack of scheduler hardware "5" = lack of total downlink hardware "6" to "255" = reserved |

TABLE 6

ALLOWED RATE INFORMATION

The Allowed Rate Information IE indicates the TFI corresponding to the highest allowed bit rate for the uplink and/or the downlink of a DCH. The information is forwarded by the CRNC to the SRNC. The SRNC is allowed to use any rate being lower than or equal to the rate corresponding to the indicated TFI.

| IE/Group Name | Presence | Range | IE Type and Reference | Semantics Description |
|---|---|---|---|---|
| Allowed UL Rate | O | | INTEGER(1 ... maxTFcount) | "1": TFI 0, "2": TFI 1, "3": TFI 2, ... |
| Allowed DL Rate | O | | INTEGER(1 ... maxTFcount) | "1": TFI 0, "2": TFI 1, "3": TFI 2, ... |

TABLE 7

GUARANTEED RATE INFORMATION

The Guaranteed Rate Information IE indicates the TFI corresponding to the guaranteed bit rate for the uplink and/or the downlink of a DCH.

| IE/Group Name | Presence | Range | IE Type and Reference | Semantics Description |
|---|---|---|---|---|
| Guaranteed UL Rate | O | | INTEGER(1 ... maxTFcount) | "1": TFI 0, "2": TFI 1, "3": TFI 2, ... |
| Guaranteed DL Rate | O | | INTEGER(1 ... maxTFcount) | "1": TFI 0, "2": TFI 1, "3": TFI 2, ... |

What is claimed is:

1. A radio access network comprising:
a radio network controller configured to perform admission control and to allocate resources of a cell;
a radio base station configured to evaluate a quantitative measure to determine overload/congestion on a high speed shared channel and to generate an indication of the overload/congestion for transmission of the indication to the radio network controller;
wherein the radio base station is further configured to generate and transmit to the radio network controller a congestion report including a reason for congestion; and
wherein the congestion reason includes at least one of (1) power and/or noise rise for a non-shared dedicated channel, (2) a code deficiency for the high speed shared channel and (3) a hardware problem;
wherein the radio network controller is configured to allocate at least some of the resources for the channel to support a guaranteed service and to allocate at least some resources to support a non-guaranteed service, and
wherein the radio base station is configured to measure and to report the downlink power utilized on the downlink channel by the uplink control channels of the high speed shared uplink channel for a guaranteed service.

2. A method of operating a radio access network comprising:
performing admission control at a radio network controller to allocate resources of a cell;
at a radio base station, evaluating a quantitative measure to determine overload/congestion on a high speed shared channel and in accordance therewith generating an indication of the overload/congestion for transmission of the indication to the radio network controller;
generating and transmitting to the radio network controller a congestion report including a reason for congestion;
wherein the congestion reason includes at least one of (1) power and/or noise rise for a non-shared dedicated channel, (2) a code deficiency for the high speed shared channel and (3) a hardware problem; and
allocating at least some of the resources for the channel to support a guaranteed service and allocating at least some resources to support a non-guaranteed service, and further comprising measuring and reporting the downlink power utilized on the downlink channel by the uplink control channels of the high speed shared uplink channel for a guaranteed service.

3. The method of claim 2, further comprising including a congestion severity indicator in the indication of the overload/congestion.

4. The method of claim 3, further comprising expressing the congestion reason in terms of an allocation/retention priority level.

5. The method of claim 2, wherein the hardware problem comprises a problem with scheduler specific hardware of the radio base station.

6. The method of claim 2, further comprising determining and reporting multiple occurrences of the overload/congestion on the shared channel(s).

7. The method of claim 2, further comprising determining and reporting the overload/congestion on both a high speed downlink shared channel and a high speed uplink shared channel.

8. The method of claim 7, further comprising determining and reporting the overload/congestion on both the high speed downlink shared channel and the high speed uplink shared channel for a cell served by the radio base station.

9. The method of claim 7, further comprising determining and reporting the overload/congestion on both the high speed downlink shared channel and the high speed uplink shared channel for a cell group served by the radio base station.

10. The method of claim 2, further comprising determining and reporting overload/congestion on a channel.

11. The method of claim 10, further comprising determining and reporting overload/congestion on the channel in accordance with one or more of the following:
   on a priority class basis;
   on a basis of guaranteed service;
   on a basis of non-guaranteed service.

12. The method of claim 2, wherein the channel is a downlink channel, and further comprising measuring and reporting downlink power utilized on the downlink channel by uplink control channels of a high speed shared uplink channel.

13. The method of claim 12, wherein the high speed shared uplink channel is an E-DCH channel and the control channels used in downlink for the E-DCH are E-HICH, E-RGCH, and E-AGCH channels.

14. The method of claim 2, further comprising setting a reserved resource level for a specified service.

15. The method of claim 14, wherein the specified service is the non-guaranteed service.

16. The method of claim 15, further comprising permitting a user(s) of the non-guaranteed service to use the resources up to the reserved resource level of resources, but wherein when there is a differential amount of reserved resources between the reserved resource level and an actual level of reserved resources utilized by the user(s) of the non-guaranteed service, allowing another user of the cell to use at least some of the differential amount of reserved resources.

17. The method of claim 16, wherein the another user is a user of the guaranteed service or a user of a non-high speed service.

18. The method of claim 17, further comprising reporting downlink power used by the non-guaranteed service and/or bit rate used by the non-guaranteed service.

19. The method of claim 2, wherein the indication of overload/congestion is an allocation/retention priority, and further comprising, on basis of the allocation/retention priority, the network taking action on a part of a connection carried by a radio link instead of taking action on the whole radio link.

20. The method of claim 2, further comprising the radio base station generating a recommended action for dealing with the overload/congestion.

21. The method of claim 20, wherein the recommended action comprises at least one of (1) reducing power and/or noise rise for a non-shared dedicated channel (e.g., DCH) and (2) adding a code for the high speed packet access channel (e.g., adding a code for a shared physical packet channel (HS-DPSCH) and/or a shared physical signaling channel (HS-SCCH)).

22. A radio base station configured to evaluate a quantitative measure to determine overload/congestion on a high speed shared channel and to generate an indication of the overload/congestion for transmission of the indication to a node which performs admission control for the high speed channel;
   wherein the radio base station is further configured to generate and transmit to the node which performs the admission control a congestion report including a reason for congestion; and
   wherein the congestion reason includes at least one of (1) power and/or noise rise for a non-shared dedicated channel, (2) a code deficiency for the high speed shared channel and (3) a hardware problem; and
   wherein the radio base station is configured to measure and to report the downlink power utilized on the downlink channel by the uplink control channels of the high speed shared uplink channel for a guaranteed service, at least some of the resources for the channel having been allocated to support the guaranteed service and at least some resources having been allocated to support a non-guaranteed service.

23. The apparatus of claim 1 or claim 22, wherein the radio base station is further configured to generate a congestion report including a congestion severity indicator.

24. The apparatus of claim 23, wherein the severity indicator is expressed in terms of an allocation/retention priority level.

25. The apparatus of claim 1 or claim 22, wherein the hardware problem comprises a problem with scheduler specific hardware of the radio base station.

26. The apparatus of claim 1 or claim 22, wherein the radio base station is configured to determine and to report multiple occurrences of the overload/congestion on the shared channel(s).

27. The apparatus of claim 1 or claim 22, wherein the radio base station is configured to determine and to report the overload/congestion on both a high speed downlink shared channel and a high speed uplink shared channel.

28. The apparatus of claim 27, wherein the radio base station is configured to determine and to report the overload/congestion on both the high speed downlink shared channel and the high speed uplink shared channel for a cell served by the radio base station.

29. The apparatus of claim 27, wherein the radio base station is configured to determine and to report the overload/congestion on both the high speed downlink shared channel and the high speed uplink shared channel for a cell group served by the radio base station.

30. The apparatus of claim 1 or claim 22, wherein the radio base station is configured to determine and to report overload/congestion on a channel.

31. The apparatus of claim 30, wherein the radio base station is configured to determine and to report overload/congestion on the channel in accordance with one or more of the following:
   on a priority class basis;
   on a basis of guaranteed service;
   on a basis of non-guaranteed service.

32. The apparatus of claim 1 or claim 22, wherein the channel is a downlink channel, and wherein the radio base station is configured to measure and to report downlink power utilized on the downlink channel by uplink control channels of a high speed shared uplink channel.

33. The apparatus of claim 32, wherein the high speed shared uplink channel is an E-DCH channel and the control channels used in downlink for the E-DCH are E-HICH, E-RGCH, and E-AGCH channels.

34. The apparatus of claim 1 or claim 22, wherein the radio base station comprises a congestion analyzer configured to evaluate the quantitative measure to determine the overload/congestion on the high speed shared channel.

35. The apparatus of claim 1 or claim 22, wherein radio base station is configured to use an allocation/retention priority to indicate a part of a connection on which a congestion action should be performed.

36. The apparatus of claim 1 or claim 22, wherein radio base station is configured to generate a recommended action for dealing with the overload/congestion.

37. The apparatus of claim 36, wherein the recommended action comprises at least one of (1) reducing power and/or noise rise for a non-shared dedicated channel (e.g., DCH) and (2) adding a code for the high speed packet access channel (e.g., adding a code for a shared physical packet channel (HS-DPSCH) and/or a shared physical signaling channel (HS-SCCH)).

* * * * *